United States Patent
Tomaru et al.

[11] Patent Number: 5,860,042
[45] Date of Patent: Jan. 12, 1999

[54] IMAGE READING METHOD AND APPARATUS WITH READ SENSOR TEMPERATURE CONTROL

[75] Inventors: Takashi Tomaru; Naoki Isozaki, both of Kanagawa, Japan

[73] Assignee: Fuji Xerox Co., Ltd., Tokyo, Japan

[21] Appl. No.: 510,442

[22] Filed: Aug. 2, 1995

[30] Foreign Application Priority Data

Aug. 3, 1994 [JP] Japan ..................................... 6-182375
Jul. 5, 1995 [JP] Japan ..................................... 7-169995

[51] Int. Cl.$^6$ .................................................... G03G 21/20
[52] U.S. Cl. ................................................. 399/92; 399/94
[58] Field of Search ........................... 399/92, 94; 355/67, 355/69; 358/474, 486

[56] References Cited

U.S. PATENT DOCUMENTS

| | | | |
|---|---|---|---|
| 4,774,550 | 9/1988 | Igarashi | 355/67 |
| 5,040,031 | 8/1991 | Hayashi | 395/114 |
| 5,138,375 | 8/1992 | Iimori | 399/111 |
| 5,177,626 | 1/1993 | Nosaki et al. | 358/486 |
| 5,341,196 | 8/1994 | Hodoshima et al. | 399/106 |

FOREIGN PATENT DOCUMENTS

| | | |
|---|---|---|
| 62-112469 | 5/1987 | Japan . |
| 1-195468 | 8/1989 | Japan . |
| 4-207256 | 7/1992 | Japan . |

*Primary Examiner*—William J. Royer
*Attorney, Agent, or Firm*—Finnegan, Henderson, Farabow, Garrett & Dunner, L.L.P.

[57] ABSTRACT

A cooling fan is rotated to cool an irradiation lamp and a read sensor during the reading operation and the standby period both. Although an airflow from the cooling fan is maximized during the reading operation, the airflow is reduced to the extent that a temperature rise originating from the self-generation of heat on the part of the read sensor in the standby condition is suppressed. Thus the temperature of the read sensor is kept constant and the characteristics of the read sensor are prevented from fluctuating. The airflow from the cooling fan can also be regulated by controlling the operating voltage to be applied to a motor for rotating the cooling fan and placing movable airflow regulating plates in the passage of the wind blown from the cooling fan. Thereby, accurate reading can be conducted in any color image reading apparatus since it is possible to minimize variation in the temperature of a read sensor for a certain time after the image reading operation is started.

8 Claims, 22 Drawing Sheets

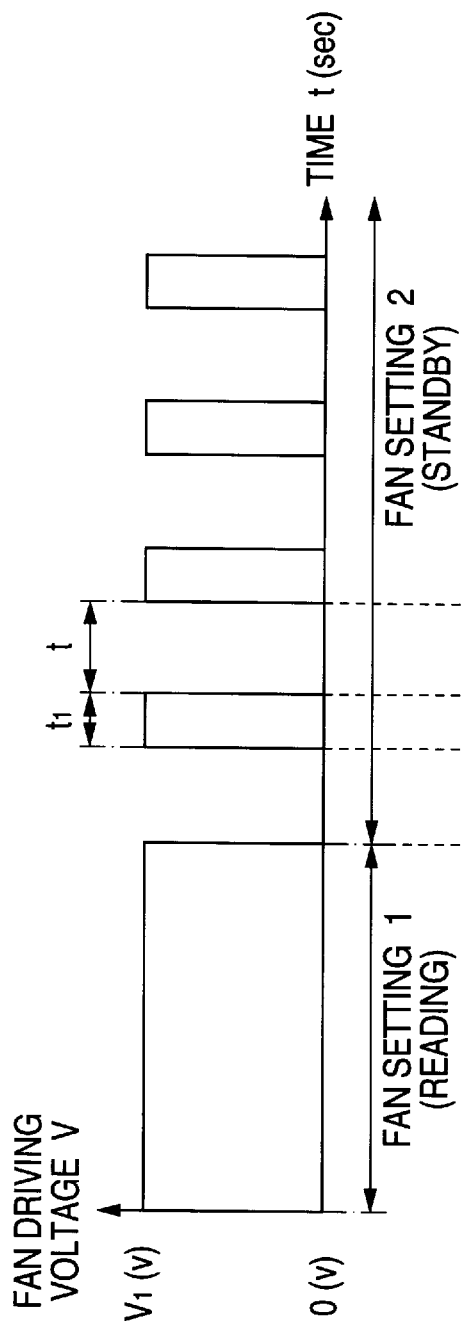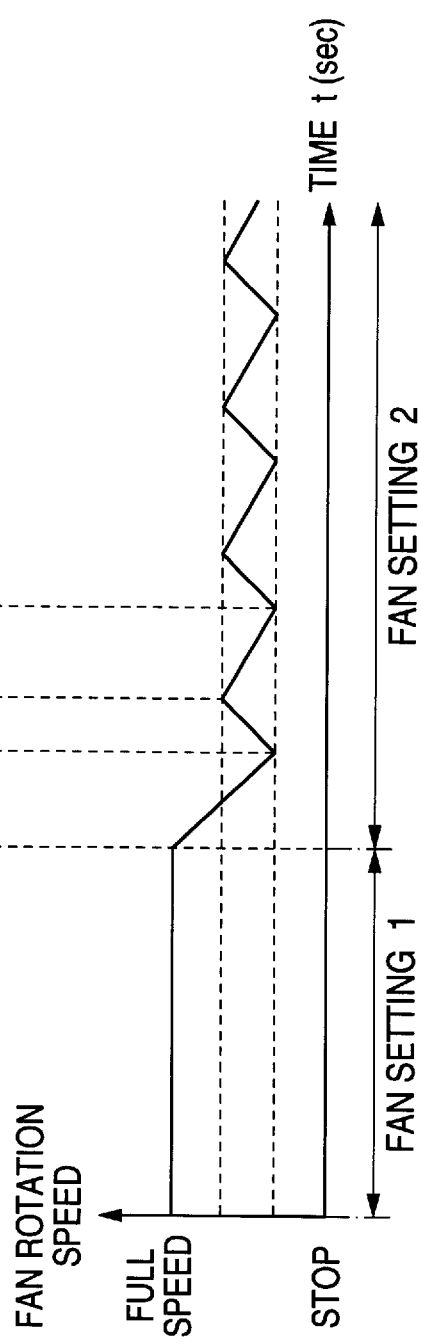
FIG. 7A
FIG. 7B

IMAGE READING METHOD AND APPARATUS WITH READ SENSOR TEMPERATURE CONTROL

BACKGROUND OF THE INVENTION

1. Field of the Invention

The present invention relates to an image reading apparatus for reading by means of a read sensor an image on the original exposed to light by an irradiation lamp, and more particularly to an image reading apparatus so designed as to prevent the deterioration of reading characteristics due to variation in the temperature of a read sensor.

2. Description of the Related Art

In image reading apparatus, an image on an original is read out by using an irradiation lamp to expose the original to light and to cause the light reflected from the original to focus on the imaging face of a sensor. Incidentally, image reading in this specification includes reading a white reference plate for shading correction, reading by pre-scanning for deciding the size of an original and whether the original is monochromatic or color and so forth in addition to the operation of reading an image on the original.

In this image reading apparatus, the irradiation lamp is turned on during the time an image is read. In consequence, the irradiation lamp generates heat during that time, which raises the temperature in the casing of the image reading apparatus and also causes the temperature of the read sensor to rise. A curve P of FIG. 27 shows variation in the temperature of the irradiation lamp.

Moreover, a CCD (Charge Coupled Device) image sensor is generally employed as the read sensor. During the image reading operation, a sensor driving circuit for driving the CCD image sensor is actuated and a clock signal is supplied from the sensor driving circuit. Therefore, the read sensor generates heat more than when it is on standby and raises its own temperature.

When the temperature of the read sensor rises, there may arise various problems: the sensitivity of the read sensor varies; the focal position of an image forming system shifts as members constituting the read sensor become deformed by thermal expansion; and the read position changes.

Accordingly, it has been a common practice to cool the irradiation lamp for the original and the read sensor by installing a cooling mechanism in the casing of the image reading apparatus. In order to simplify such a cooling mechanism in this case, one cooling fan is normally charged with cooling both the irradiation lamp and the read sensor during the image reading operation. With the cooling mechanism, the temperature of each of the members including the read sensor is kept remaining close to a predetermined temperature level during the image reading operation.

In the case where the read sensor is driven only during the image reading operation as noted previously, the reading characteristics of the read sensor may become unstable immediately after electric power is supplied thereto, that is, while the read sensor remains in low-temperature condition. Therefore, the driving voltage is always applied to the read sensor to obviate the instability of the reading characteristics of the read sensor immediately after the power is supplied thereto. Notwithstanding, the temperature of the read sensor still continue rising gradually even during the time no images are read, that is, in the standby condition.

In the conventional image reading apparatus, the cooling fan is rotated during the image reading operation to cool the read sensor as well as the irradiation lamp. Since the driving voltage is applied to the read sensor even in the standby condition as set forth above, the temperature of the read sensor rises because of the self-generation of heat as shown by the curve Q of FIG. 27, the read sensor together with the irradiation lamp is cooled when the reading operation is started and its temperature lowers and settles down to a constant temperature $T_1$ a predetermined time $t_1$ after.

On the other hand, parameters for use in forming images in the image reading apparatus are usually set in an area S where temperatures are stabilized. Thus the sensitivity of the read sensor and the configuration of the read-sensor fitting member are caused to vary until the time $t_1$ (sec) is stabilized. Even when the same original is read, the image data varies with the lapse of time in the course of processing the image by subjecting the image signal thus read to A/D conversion.

In the case of a monochromatic image reading apparatus, any readout image is set free from being badly affected even though the sensitivity of a read sensor varies because the output of the read sensor is normally subjected to a black-and-white binary process.

In contrast with the monochromatic image reading operation, colors are each read by multiple gradations, for example, 256 gradations in a color image reading apparatus, whereby variations in the sensitivity of the read sensor appear as variations in the gradation of an image to be read. Particularly in the color image reading apparatus, the tone of the image varies with the change of gradation of each color.

In other words, as shown by the curve Q of FIG. 27, the temperature as a basis in setting each parameter may differ from the actual temperature during the period $t_1$ (sec) from the start of the image reading operation until the temperature of the read sensor settles down to the predetermined temperature $T_1$. Consequently, there arises inconvenience in that an image different in coloring from the original image is read for the duration of time $t_1$ (sec).

SUMMARY OF THE INVENTION

An object of the present invention is to render an image accurately readable even in a color image reading apparatus.

Another object of the present invention is to make the noise generated from a cooling fan hardly perceivable by the human sense of hearing.

An image reading apparatus according to the present invention comprises a read sensor for reading an image on a reading plane, a fan in an air passage in which the read sensor is also placed, and a fan drive control unit for driving the fan at least excluding the period during which the image is read by the read sensor.

Further, an image reading apparatus according to the present invention comprises an irradiation lamp for exposing to light an image on a reading plane, a read sensor for reading the image on the reading plane, a fan in an air passage in which the irradiation lamp and the read sensor are also placed, fan driving means for driving the fan, and airflow reducing means for reducing the quantity of the air generated from the fan driven by the fan driving means and allowed to reach the read sensor during the time the irradiation lamp is off.

Furthermore, an image reading apparatus according to the present invention comprises an irradiation lamp for exposing to light an image on a reading plane, a read sensor for reading the image on the reading plane, a fan in an air passage in which the irradiation lamp and the read sensor are also placed, fan driving means for driving the fan, and fan drive control means for operating the fan driving means during the time the irradiation lamp is on and for a predetermined time after it is turned off.

In an image reading method for sequentially providing the standby condition in which no images on the reading plane are read by a read sensor after an irradiation lamp is turned off, and the reading condition in which images are read by the read sensor after the irradiation lamp is turned on, the read sensor is cooled at least during the standby period.

Since the fan is driven excluding the period during which an image is read by the read sensor according to the present invention, a rise in the temperature of the read sensor in the standby condition is minimized. Thus the image is read at the predetermined temperature immediately after the reading operation is started to ensure that the image is read with a precise gradation.

While the image is being read or during the standby period, moreover, the irradiation lamp and the read sensor are cooled by rotating the cooling fan. However, an airflow reaching the read sensor from the cooling fan is reduced during the standby period. Therefore, the read sensor is restrained from being excessively cooled but is cooled to the extent that the rise in the temperature of the read sensor due to its self-generation of heat is suppressed. As a result, the temperature of the read sensor is substantially kept constant and the characteristics of the read sensor are prevented from fluctuating.

Moreover, the fan driving means is driven for a predetermined time after the irradiation lamp is turned off, whereby noise is reduced as the cooling fan is not frequently turned on and off.

BRIEF DESCRIPTION OF THE DRAWINGS

FIGS. 7A and 7B are graphic representation showing the relation between the fan driving voltage and the number of revolutions of the fan;

DESCRIPTION OF THE PREFERRED EMBODIMENTS

Figure 1A:
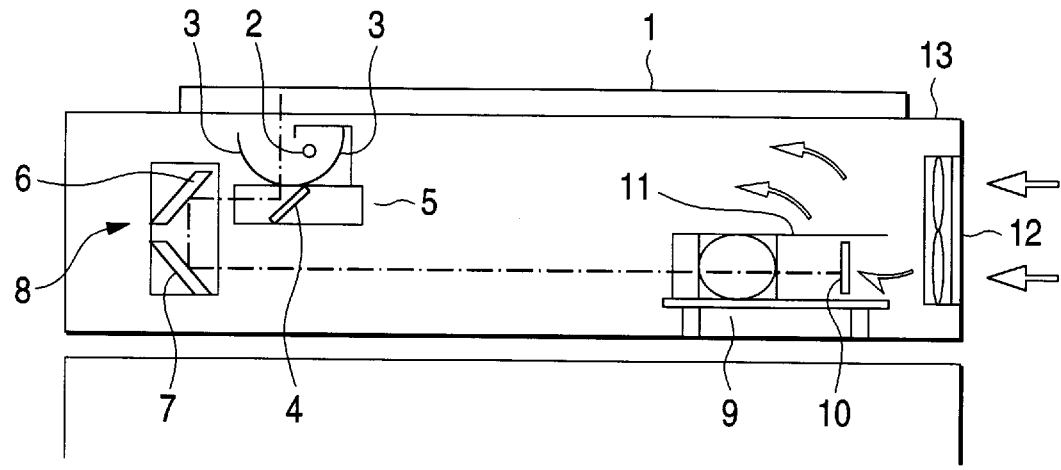
FIGS. 1A and 1B are schematic sectional views of an image reading apparatus according to the present invention.

Referring to the drawings, a description will subsequently be given of specific features of the present invention based on its embodiments.

Embodiment 1

Figure 1B:
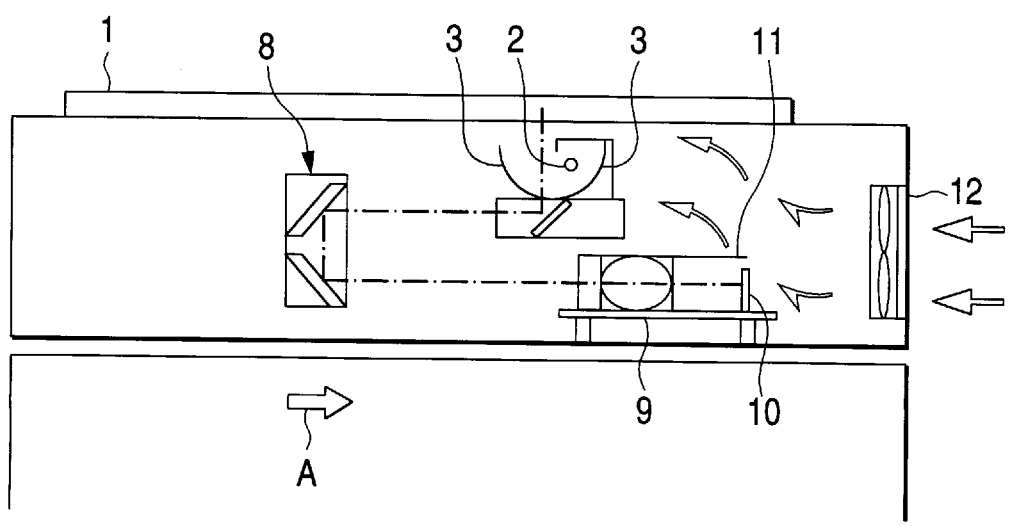
Figure 2A:
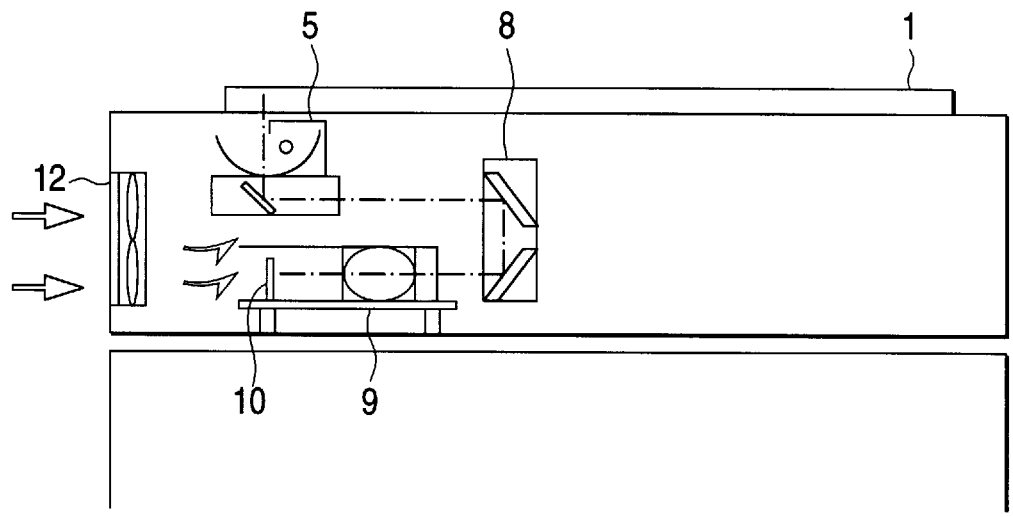
FIGS. 2A and 2B are schematic sectional views of another image reading apparatus according to the present invention.
Figure 2B:
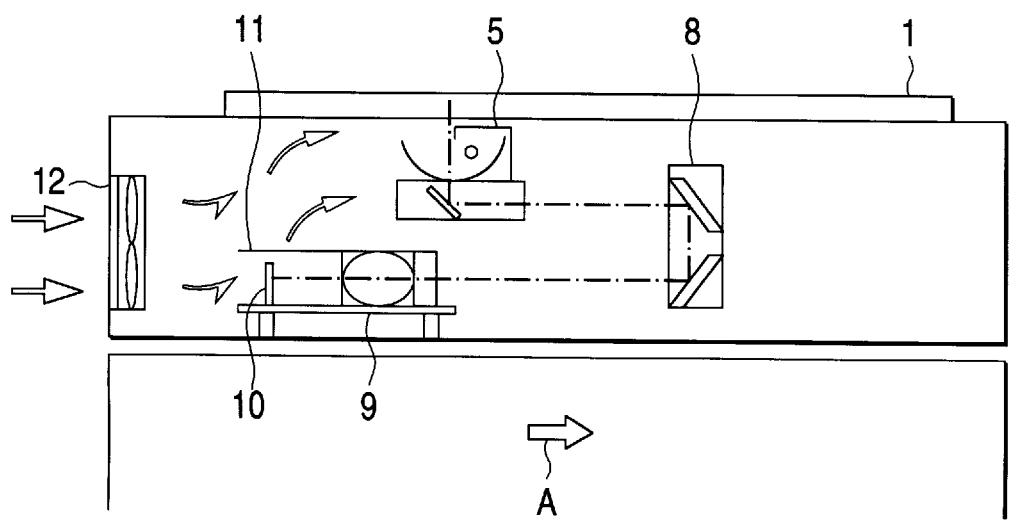

FIGS. 1A, 1B, 2A and 2B are schematic sectional views of image reading apparatus embodying the present invention as those different in construction from each other. FIGS. 1A and 2A show the image reading apparatus in the standby condition, while FIGS. 1B and 2B show the apparatus during the reading operation. The image reading apparatus comprises: a glass platen 1 for use in mounting an original, an irradiation lamp 2, a reflective plate 3, a mirror 4, a first scanning carriage 5 which is moved along the underside of the glass platen 1, mirrors 6, 7, a second scanning carriage 8 which is moved at half the rate of the first scanning carriage 5, an image forming lens 9, a read sensor 10 such as a CCD image sensor where the light reflected from the original is formed into an image via the image forming lens 9, a shielding member 11 for preventing light other than what is reflected from the original from being incident on the read sensor 10, a cooling fan 12 for commonly cooling the irradiation lamp 2 and the read sensor 10, and a casing 13 for carrying each of these members.

While moving in the direction of an arrow A, the first scanning carriage 5 causes the original to be irradiated with light by means of the irradiation lamp 2, and the second scanning carriage 8 is simultaneously moved at half the rate of the first scanning carriage 5 in the same direction to regulate the optical path length so that the image on the original may always be formed on the read sensor 10.

In the image reading apparatus of FIGS. 1A and 1B, the first and second scanning carriages 5, 8 in the standby condition are positioned opposite to the cooling fan 12, whereas in the image reading apparatus of FIGS. 2A and 2B, the first and second scanning carriages 5, 8 in the standby condition are positioned on the same side of the cooling fan 12; however, either arrangement may be adopted as occasion demands.

Figure 3:
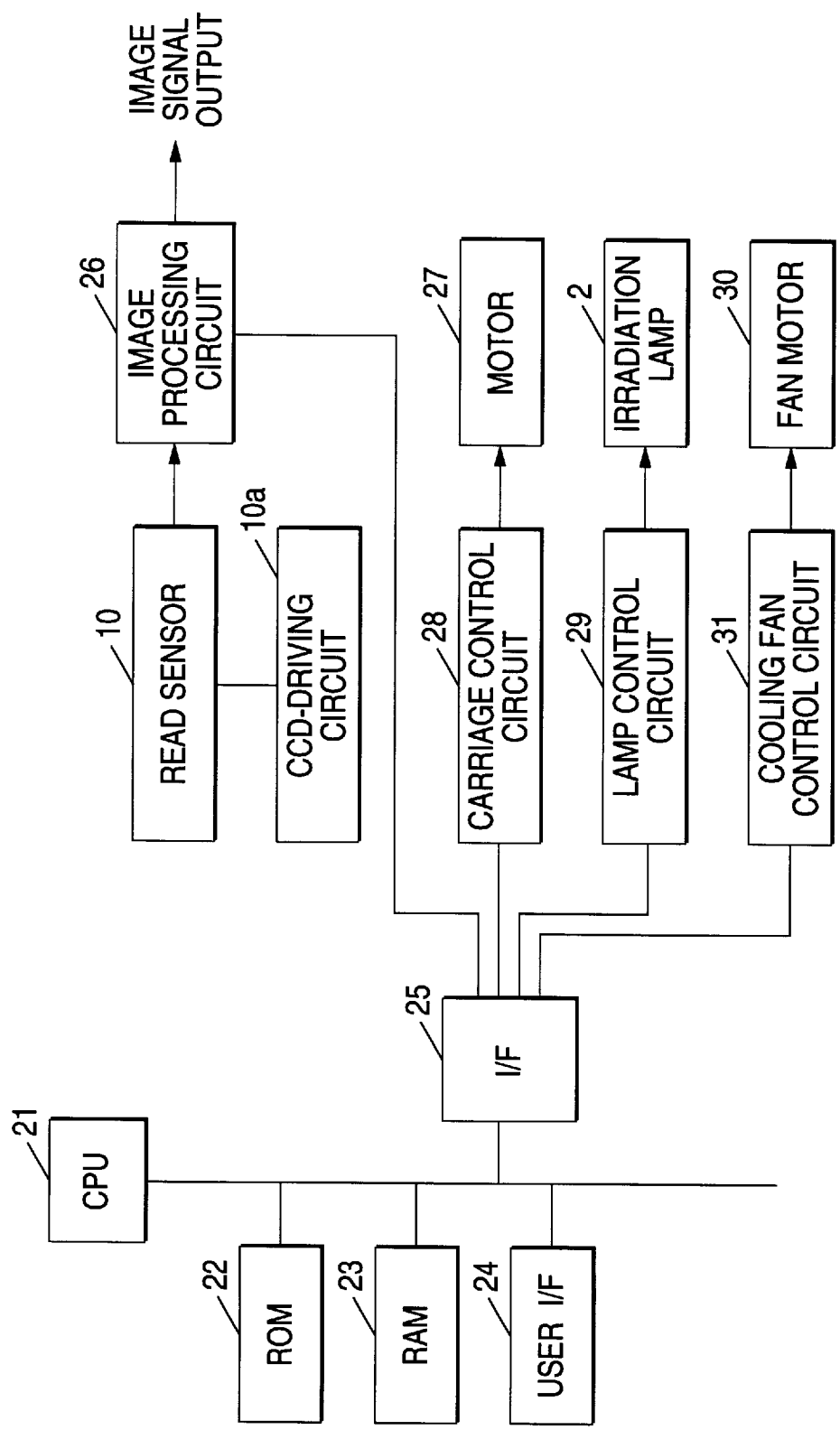
FIG. 3 is a block diagram showing the control system of the image reading apparatus of FIGS. 1A and 1B.

FIG. 3 is a block diagram showing the control system of the image reading apparatus of FIG. 1. The following are connected to CPU (Central Processing Unit) 21: ROM (Read Only Memory) 22 to which programs and the like are written; RAM (Random Access Memory) 23 for use as work areas and the like; and a user interface 24 for use when the user inputs various instructions to an original reading unit, and the operating conditions of the original reading unit. The following are also connected via an interface 25 to the CPU 21: an image processing circuit 26 for subjecting an image signal from the read sensor 10 driven by a CCD driving circuit 10a to a predetermined process and outputting the signal thus processed, a carriage control circuit 28 for controlling the rotation of a motor 27 for driving the scanning carriages 5, 8, a lamp control circuit 29 for controlling the switching of the irradiation lamp 2, a cooling fan control circuit 31 for controlling the rotation of a fan motor 30 for driving the cooling fan 12 and the like.

Figure 4:
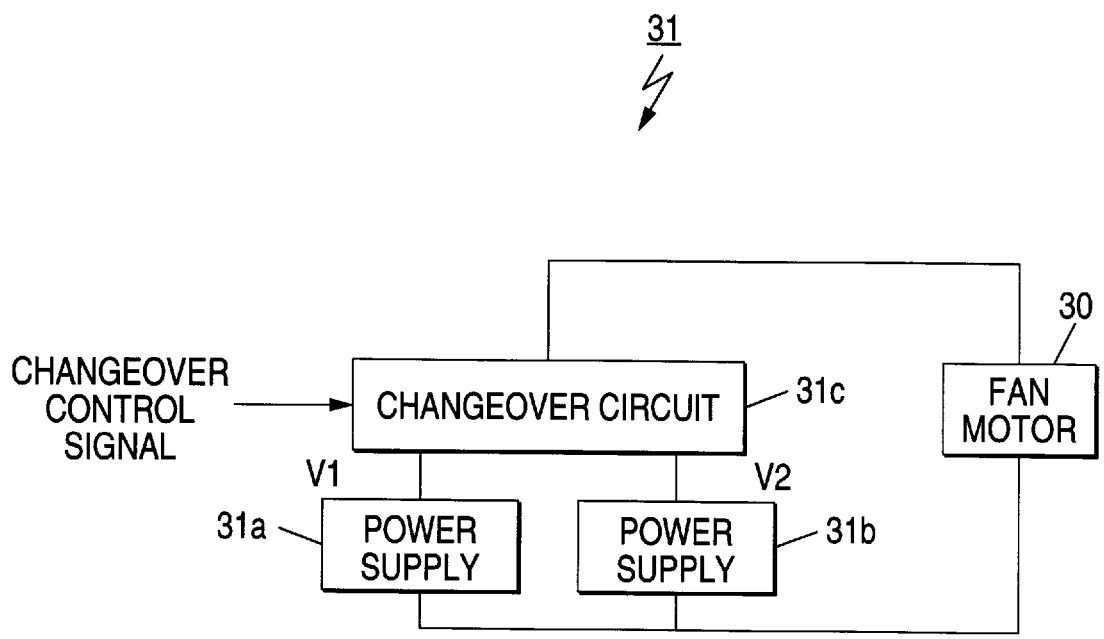
FIG. 4 is a block diagram showing an exemplary cooling fan control circuit arrangement.

FIG. 4 is a block diagram showing an exemplary arrangement of a cooling fan control circuit 31. The cooling fan control circuit 23 has two power supplies 31a, 31b different in voltage. The voltage V1 of the power supply 31a is set great enough to rotate the cooling fan 12 at a relatively high speed so as to achieve a sufficient cooling effect even during the reading operation in which the lighted lamp generates a great deal of heat, whereas the voltage V2 of the power supply 31b is set low in that the cooling fan 12 is rotated at a relatively low speed to the extent that the read sensor 10 self-generating a small quantity of heat is cooled; namely, V1>V2. Either voltage V1 or V2 is supplied to the fan motor 30 via a changeover circuit 31c to be controlled by a changeover signal from the CPU 21. In this case, the fan motor 30 is a DC motor, and the power supplies 31a, 31b are DC power supplies.

Figure 5:
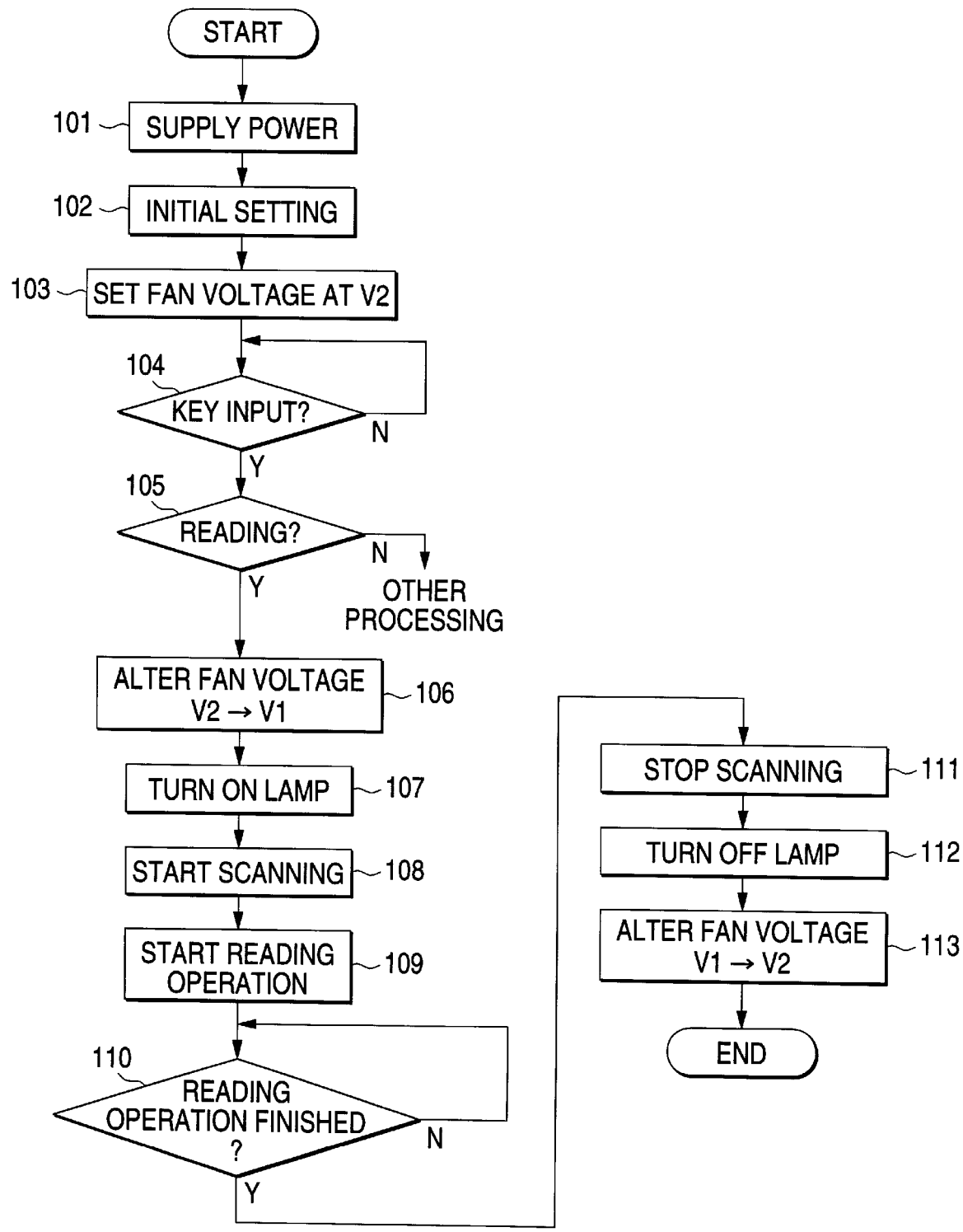
FIG. 5 is a flowchart illustrating the operation of the image reading apparatus according to the first embodiment of the invention.

FIG. 5 is a flowchart illustrating the operation of the image reading apparatus above.

When power is supplied to the image reading apparatus (Step 101), initial setting is carried out in each member of the image reading apparatus (Step 102). Further, the changeover signal from the CPU 21 causes the changeover switch 31c to be switched to the power supply 31b, and the operating voltage intended for the cooling fan 12 is set at V2 (Step 103). The cooling fan 12 is thus rotated at the low speed. Human keying is waited for in this state. In the standby condition, the first scanning carriage 5 is, as shown in FIG. 1A, positioned at the scanning start side end (home position) of the glass platen 1, and the irradiation lamp 2 remains off. Subsequently, the presence or absence of keying via the user interface 24 is detected (Step 104) and if there is an instruction as to starting the reading operation (Step 105), the operating voltage for the cooling fan 12 is altered to V1 (Step 106). Thus the cooling fan 12 is rotated at high speed. Further, the CPU-21-controlled lamp control circuit 29 turns on the irradiation lamp 2 (Step 107), and the CPU-21-controlled carriage control circuit 28 starts the operation of the motor 27 for driving the scanning carriages 5, 8 and besides the first scanning carriage 5 equipped with the irradiation lamp 2, together with the second scanning carriage 8, is moved in direction of arrow A (FIGS. 1B and 2B) to start scanning (Step 108). Consequently, the original is sequentially irradiated by the irradiation lamp 2 in the sub-scanning direction. The light reflected from the original is formed into an image on the read sensor 10 via the mirrors 4, 6, 7 and the lens 9, whereby the operation of reading the image is started (Step 109).

The read sensor 10 such as a CCD image sensor receives a clock pulse for charge transfer from the external CCD driving circuit 10a and starts reading the image on the original. The output of the read sensor 10 is supplied to the image processing circuit 26 wherein it is subjected to the predetermined imaging process before being output therefrom.

When the image reading operation is terminated (Step 110), the scanning is stopped (Step 111), and the first scanning carriage 5 and the second scanning carriage 8 are made to return to the home position and set to the standby condition. Further, the irradiation lamp 2 is turned off (Step 112), and the operating voltage for the cooling fan 12 is altered to V2 (Step 113). Therefore, the cooling fan 12 rotates at the low speed again.

Figure 27:
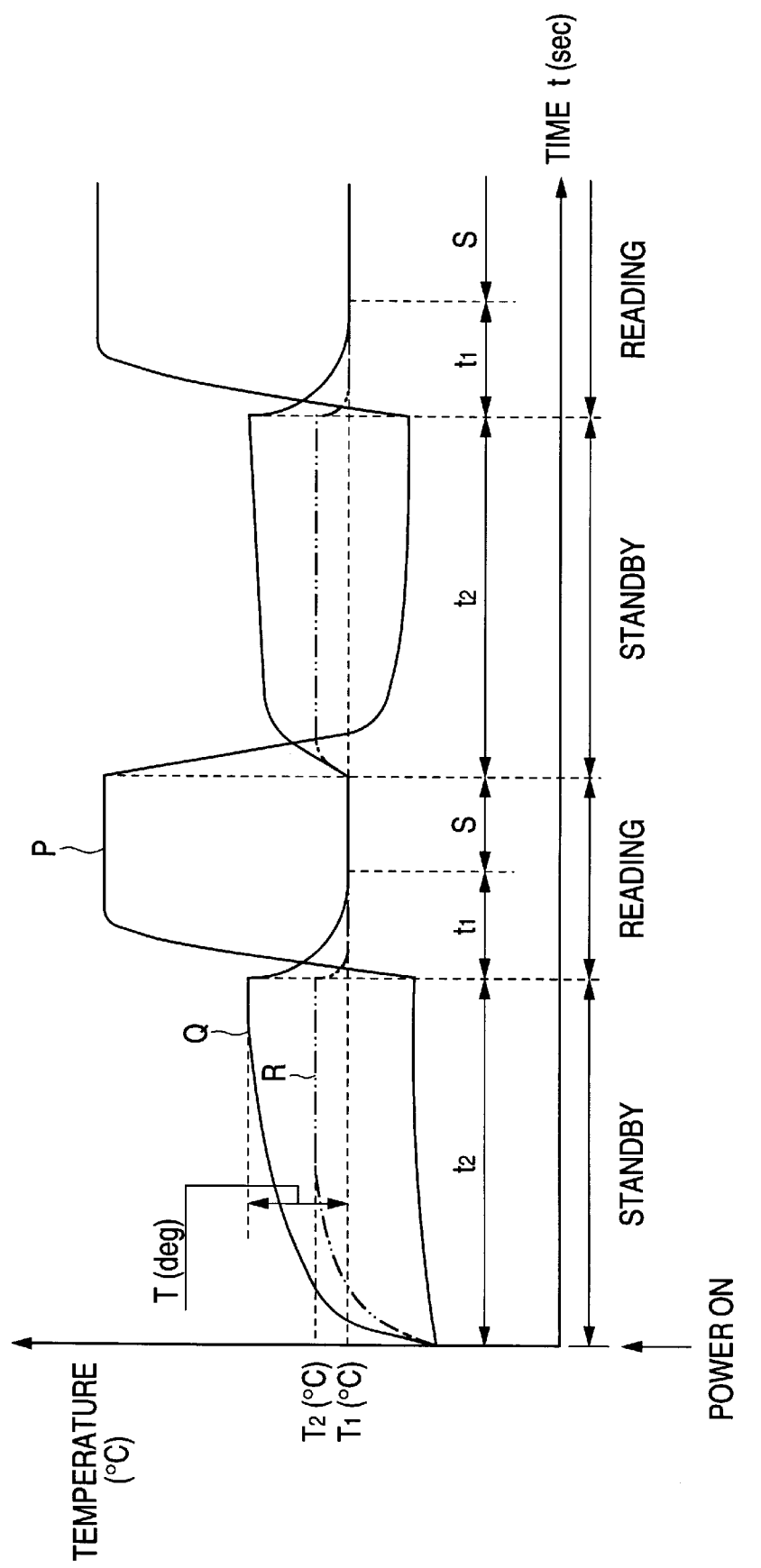
FIG. 27 is a graphic representation showing variations in the temperatures of the irradiation lamp and the read sensor in the standby condition and during the reading operation.

Since the cooling fan 12 is rotated even during the standby period in the first embodiment of the present invention as aforementioned, the rise in the temperature of the read sensor 10 in the standby condition can be suppressed to $T_2$ (where $|T_2-T_1|<T$) (°C.) as shown by a characteristic curve R of a two-dot chain line in FIG. 27 even when the driving voltage is applied to the read sensor 10 at all times. Consequently, the temperature of the read sensor can be maintained at the predetermined temperature $T_1$ immediately after the reading operation is started and the image can be read with a stable gradation. Particularly in the case of a color image reading apparatus, it is extremely important to stabilize the characteristics of the read sensor because the tone of the readout image will appear to vary if there develop differences among the gradation characteristics of respective colors, red, green and blue, and the variation is apt to be perceived as the deterioration of image quality.

Although the cooling fan 12 is rotated during the standby period and the reading operation both in the first embodiment of the present invention, moreover, the rotational speed of the cooling fan 12 during the standby period is set lower than that during the reading operation, whereby the generation of noise from the fan motor 30 and the cooling fan 12 can be suppressed.

Embodiment 2

Figure 6:
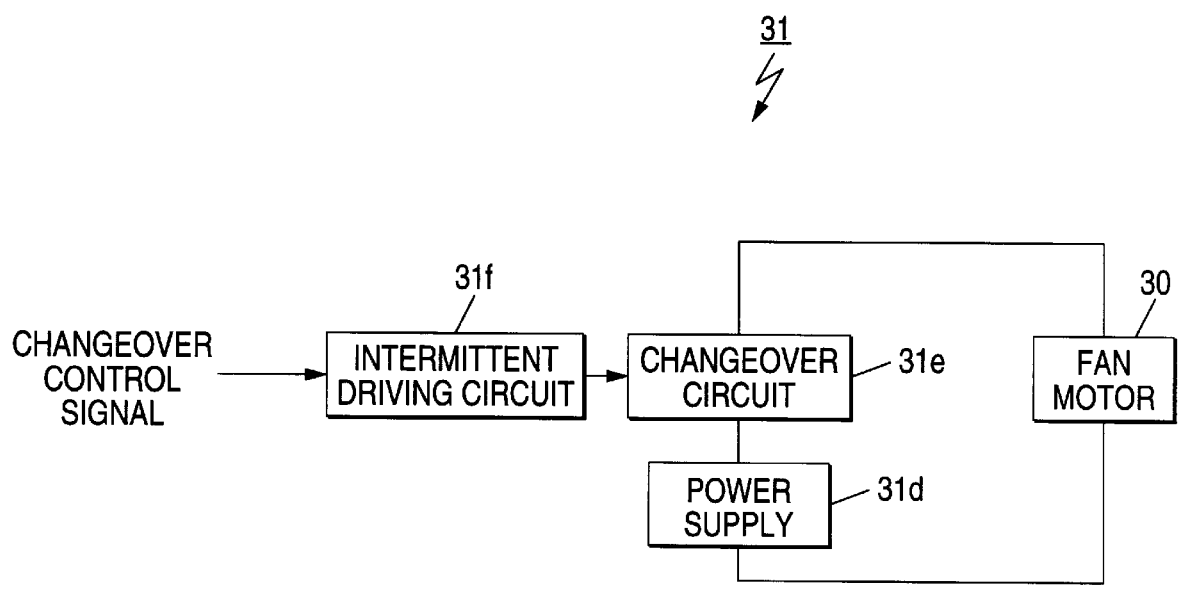
FIG. 6 is a block diagram showing another exemplary cooling fan control circuit arrangement.

FIG. 6 is a block diagram showing another exemplary arrangement of the cooling fan control circuit 31. The cooling fan control circuit 31 has a power supply 31d, a changeover circuit 31e provided between the power supply 31d and the fan motor 30 and used for making and breaking the operating voltage for the fan motor 30, and an intermittent driving circuit 31f for controlling the on-off cycle of the changeover circuit 31e according to a control signal from the CPU 21. Like the first embodiment of the present invention, the voltage V1 of the power supply 31d is set great enough to rotate the cooling fan 12 at a relatively high speed so as to achieve a sufficient cooling effect even during the reading operation in which the lighted irradiation lamp 2 generates a great deal of heat.

The cooling fan control circuit 31 has two operating modes in the second embodiment of the present invention.

The cooling fan 12 is continuously rotated in one mode (called "fan setting 1"), whereas it is intermittently rotated in the other (called "fan setting 2"). FIGS. 7A and 7B show the relation between the fan driving voltage and the number of revolutions of the fan in each mode.

The "fan setting 1" is established during the reading operation and as shown in FIG. 7A, the voltage V1 is continuously applied from the power supply 31d to the fan motor 30. Consequently, the cooling fan 12 rotates at full speed, so that the irradiation lamp 2 and the read sensor 10 are sufficiently cooled.

Moreover, the "fan setting 2" is established in the standby condition, and the voltage V1 is intermittently applied to the fan motor 30. Since inertia is inherent in the fan motor 30, the number of revolutions of the cooling fan 12 gradually increases during the time the voltage V1 is applied thereto, whereas the number of revolutions of the cooling fan 12 gradually decreases during the time it is not applied thereto. Consequently, the on-off repetition of the power results in rotating the cooling fan 12 in the range of the full speed to a halt. Thus the noise generated from the fan motor 30 and the cooling fan 12 can be suppressed.

In this case, the on-period $t_1$ (sec) and the off-period $t_2$ (sec) are determined so that the temperature of the read sensor 10 registers $T_1$ (°C.) as shown in FIG. 27. At this time, it is desirable to select the period $t_1$ (sec) during which the cooling fan 12 is not allowed to reach the full speed, and the period $t_2$ during which the cooling fan is not allowed to stop. The reason for this will subsequently be described.

Assuming that one cycle period of on-off is 3 (sec) and that the operating time of the fan is $\frac{1}{10}$, $t_1$=0.3 (sec), $t_2$=2.7 (sec). As shown in FIG. 7A, V=0(v) before the cooling fan reaches the full speed, and the fan attempts to stop. Notwithstanding, V=V1(v) is entered $t_2$ (sec) after and the fan appears to rotate at low speed to the eye. Thus one will be set free from feeling uneasy about hearing the variation of sound flying through the air at the time of on-off switching. If, however, one cycle time ($t_1+t_2$) exceeds 5 seconds, the variation of the fan sound flying through the air tends to become offensive to human ears because the fan rises up to the full speed when it is turned on and stops when it is turned off, despite the fact that the cooling effect is unchanged on condition that the $t_1/(t_1+t_2)$ ratio remains the same.

Figure 8:
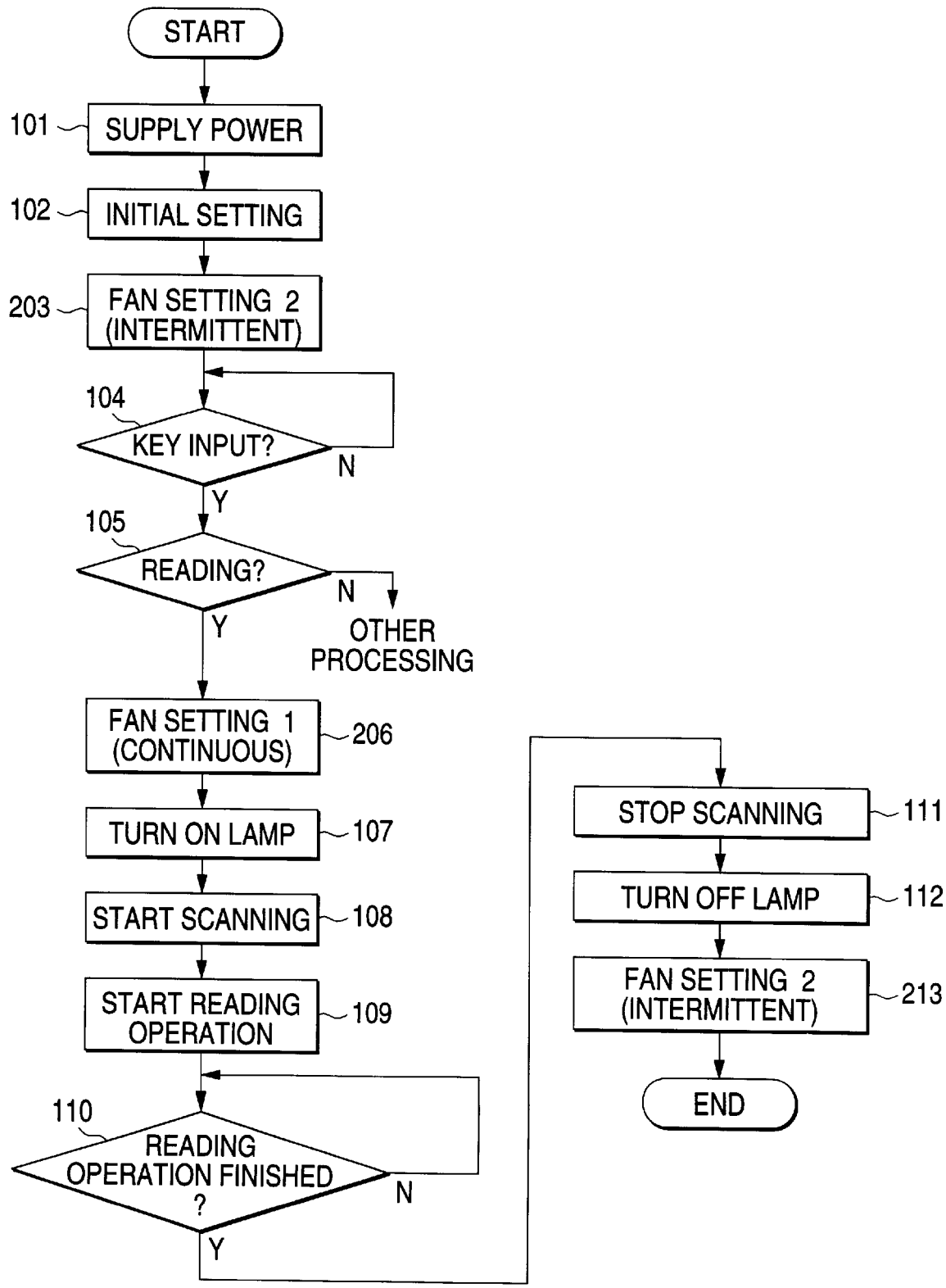
FIG. 8 is a flowchart illustrating the operation of an image reading apparatus as the second embodiment of the present invention.

FIG. 8 is a flowchart illustrating the operation of an image reading apparatus as the second embodiment of the present invention. Like reference characters are given to steps corresponding to those in the first embodiment of the present invention and the description thereof will be omitted.

In the second embodiment of the present invention, the intermittent driving circuit 31f is set so as to operate intermittently according the changeover control signal from the CPU 21 at Step 203. Consequently, the changeover circuit 31e is turned on-off with a predetermined cycle, and the cooling fan 12 is rotated at low speed after the voltage V1 is intermittently applied to the fan motor 30. Therefore, noise originating from the fan motor 30 and cooling fan 12 in the standby condition will not offend human ears. At Step 206, moreover, the intermittent driving circuit 31f is set so as to operate continuously and the changeover circuit 31e is continuously turned on, whereby the cooling fan 12 is rotated at high speed when the voltage V1 is continuously applied to the fan motor 30. Consequently, the irradiation lamp 2 and the read sensor 10 are sufficiently cooled. Further, the intermittent driving circuit 31f is set so as to operate intermittently at Step 213. Thus the cooling fan 12 is rotated at low speed again.

The same effect as that of the first embodiment of the present invention is also achievable in the second embodiment thereof.

Embodiment 3

Figure 9:
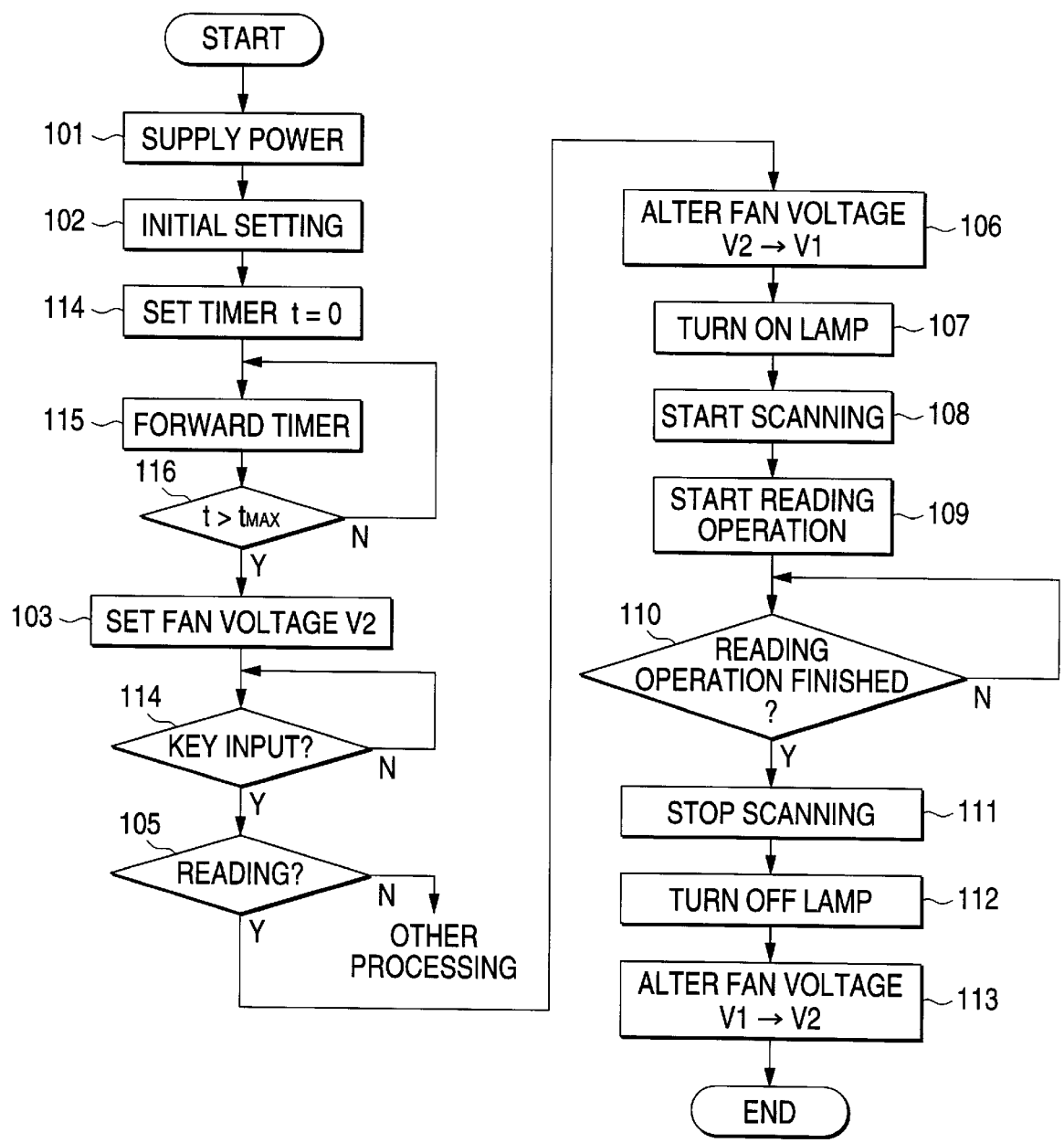
FIG. 9 is a flowchart illustrating a third embodiment of the present invention.

FIG. 9 is a flowchart illustrating a third embodiment of the present invention. Like reference characters are given to steps corresponding to those in the flowchart in the first embodiment of the present invention shown in FIG. 5.

Figure 10:
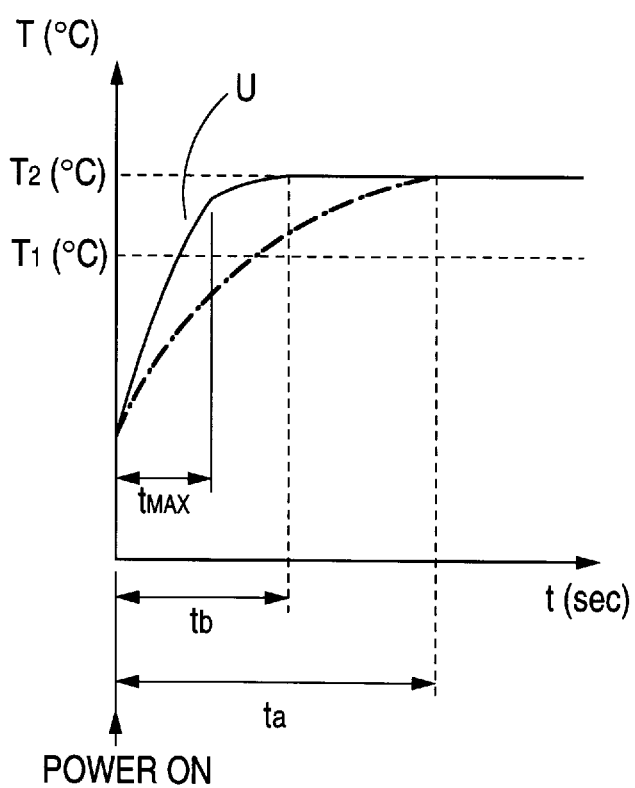
FIG. 10 is a graphic representation showing characteristic curves in the third embodiment of the present invention.

In the third embodiment of the present invention, the operation of the cooling fan 12 is kept stopping for a predetermined period solely immediately after the power is supplied thereto and a fan operating voltage of V2 is set after the lapse of predetermined time $t_{MAX}$ (Steps 114, 115, 116). As is obvious from FIG. 10, the temperature rises along the characteristic curve U of FIG. 10 until the lapse of predetermined time $t_{MAX}$ and then the cooling fan 12 operates, whereby the temperature of the read sensor 10 can be converged to $T_2$ °C. earlier. The warm-up time of the reading apparatus is shortened from ta to tb.

Embodiment 4

Figure 11:
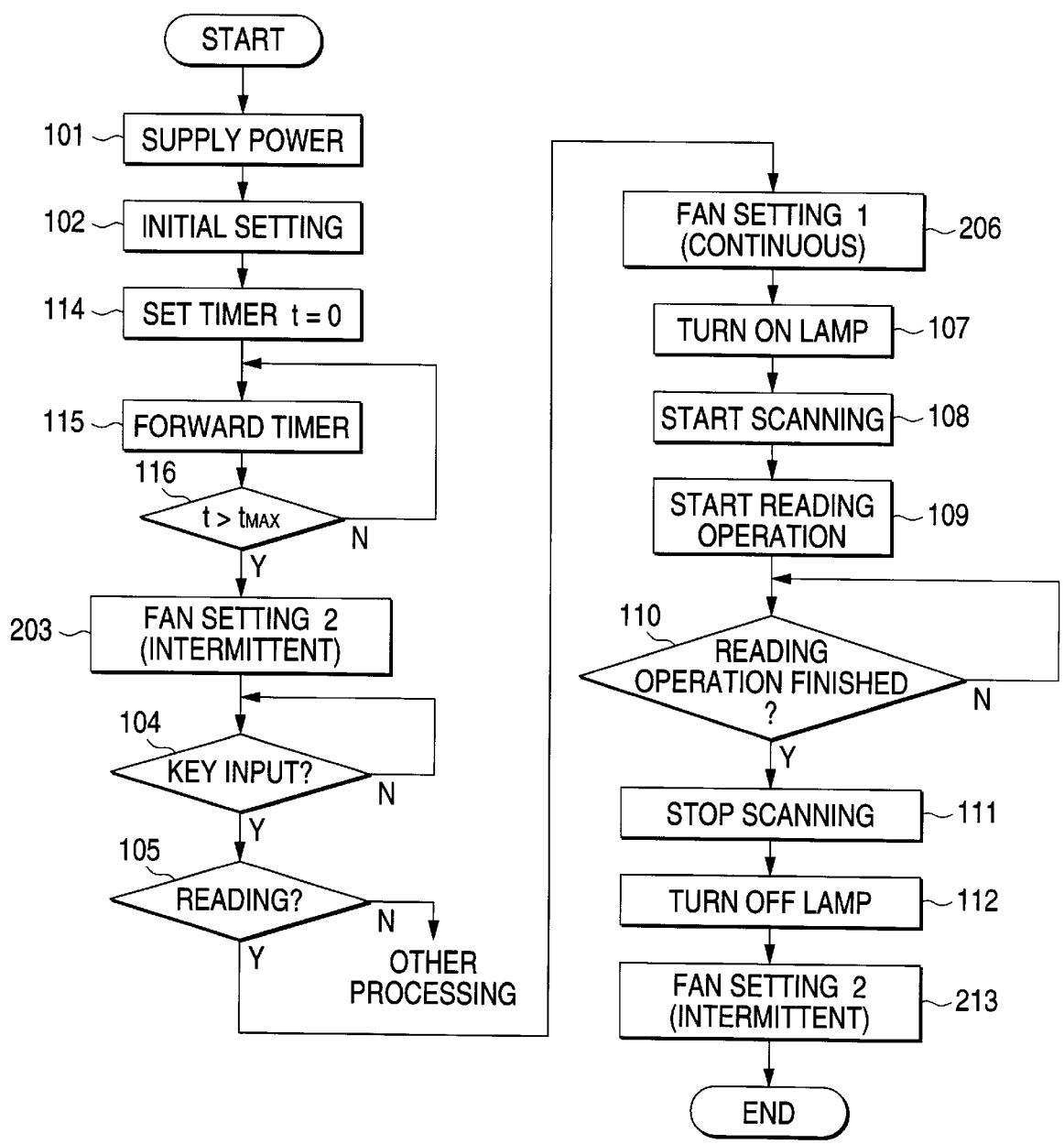
FIG. 11 is a flowchart illustrating a fourth embodiment of the present invention.

Although the airflow has been controlled by varying the operating voltage of the fan in the third embodiment of the present invention, it is also made controllable by varying the driving cycle of the cooling fan 12. FIG. 11 is a flowchart in this case and like reference characters are given to steps corresponding to those in the flowchart in the third embodiment of the present invention of FIG. 9. The flowchart shown in FIG. 11 is different from what is shown in FIG. 9 in that: setting the intermittent operation for the fan (Step 203) in place of setting the voltage V2 therefor (Step 103); setting the intermittent operation for the fan (Step 206) in place of setting the voltage V1 therefore (Step 106); and setting the intermittent operation for the fan (Step 213) in place of setting the voltage V2 therefore (Step 113).

Embodiment 5

With respect to individual specifications on the operation of the reading apparatus, and the copy sizes unconditionally determined by original sizes and reduction/magnification ratios specifically in a copying machine, a lamp, particularly a lamp whose power consumption is great may be turned off temporarily when copying paper is large, when the reading operation is repeated several times and when an interval exists between the termination of one reading operation and the start of the following reading operation. The operation of the fan at this time is tantamount to the standby condition, and the operating noise of the reading apparatus may be felt to be sound offensive to human ears when the operation of the fan varies simultaneously with the start of the read operation. Therefore, it has been arranged in the fifth embodiment of the present invention that when the lamp is turned off for only a short time, the operation of the fan is not stopped.

Figure 12:
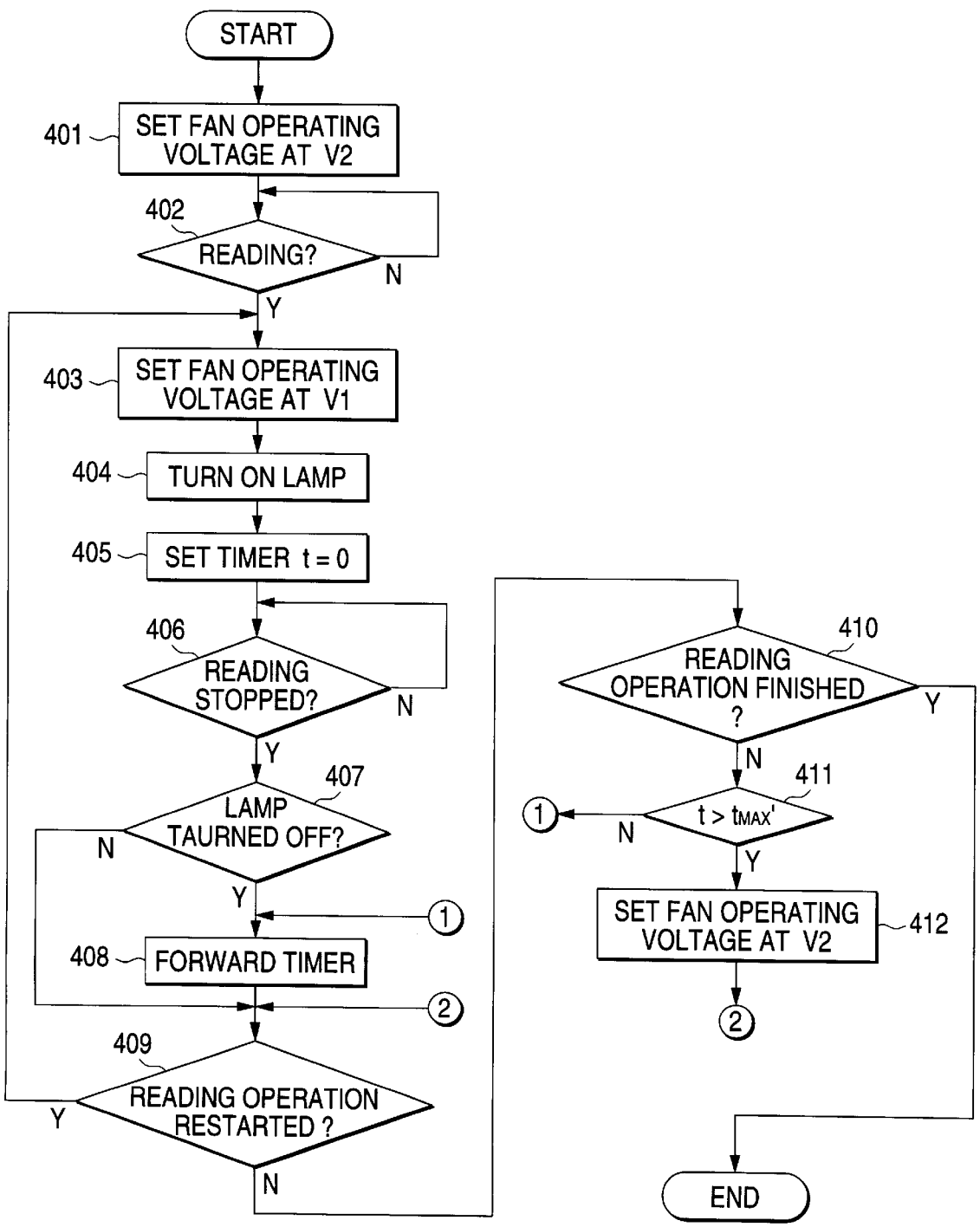
FIG. 12 is a flowchart illustrating a fifth embodiment of the present invention.

FIG. 12 is a flowchart showing the operation of the fifth embodiment of the present invention.

First, the operating voltage for the cooling fan 12 is set to V2 according to a changeover control signal from the CPU 21 (Step 401). Thus the cooling fan 12 is rotated at low speed. The start of the reading operation is waited for in this state (Step 402). When the reading operation is started, the operating voltage for the cooling fan 12 is set to V1 (Step 403). Thus the cooling fan 12 is rotated at high speed. Moreover, the irradiation lamp 2 is turned on (Step 404), and the scanning of the original is started. Subsequently, a timer is set to t=0 (Step 405), and the stopping of the reading operation is waited for (Step 406). When the reading operation is stopped and when the lamp is turned off (Step 407), the timer is put forward (Step 408). When the reading operation is restarted, Step 403 is followed again (Step 409). When the reading operation is terminated (Step 410) without the restart of the reading operation, the processing ends. When the reading operation is not terminated, the time t of the timer is compared with predetermined $t_{MAX}$, and unless $t>t_{MAX}$, Step 408 is followed again. If $t>t_{MAX}$ (Step 411) then, the operating voltage for the cooling fan 12 is set to V2 (Step 412), and the cooling fan 12 is rotated at low speed. Subsequently, Step 409 is followed again.

Although the fan control circuit 31 switches the operation of the fan on receiving the changeover control signal for switching the operation of the fan from the CPU 21 as aforementioned, the operation of the fan is left unchanged when the lamp is unlit only for a time less than $t_{MAX}$ by providing a predetermined delay time $t_{MAX}$ with respect to only the signal for switching from the lighted lamp to the unlighted one. Thus the rotation of the fan is made constant during the copying operation and set free from being offensive to human ears. A delay time setting circuit for materializing the timer may be provided on either CPU 21 or fan control circuit 31 side.

Embodiment 6

Figure 13:
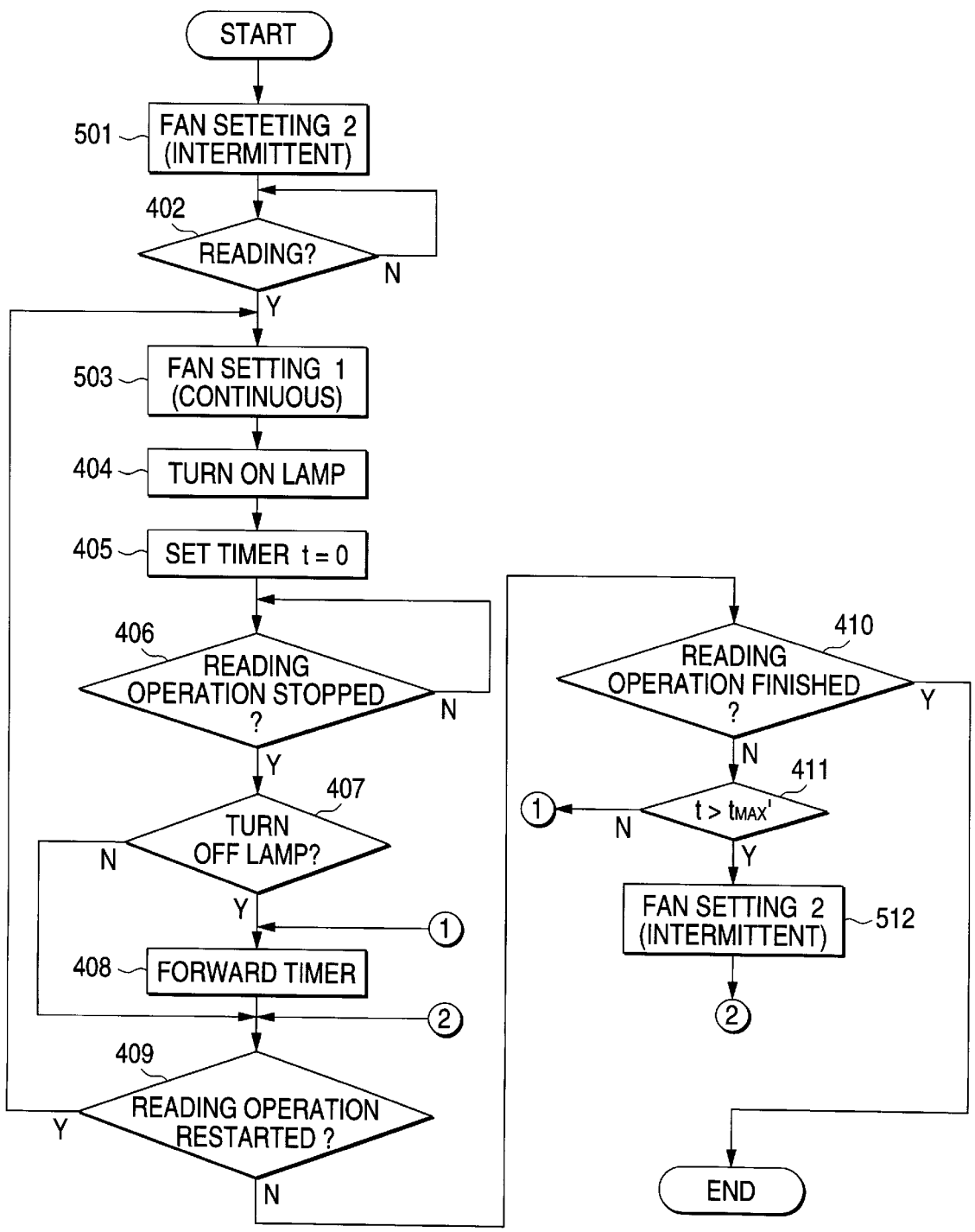
FIG. 13 is a flowchart illustrating a sixth embodiment of the present invention.

Although the airflow is controlled by varying the operating voltage of the fan in the fifth embodiment of the present invention, it may be controlled by varying the driving cycle of the cooling fan 12. FIG. 13 shows a flowchart in this case, wherein like reference characters are given to steps corresponding to those in the flowchart of FIG. 12. The flowchart shown in FIG. 13 is different from what is shown in FIG. 12 in that: setting the intermittent operation for the fan (Step 501) in place of setting the voltage V2 therefor (Step 401); setting the intermittent operation for the fan (Step 503) in place of setting the voltage V1 therefore (Step 403); and setting the intermittent operation for the fan (Step 512) in place of setting the voltage V2 therefore (Step 412).

Obviously, the same effect as that of the above fifth embodiment of the present invention is also obtainable from the sixth embodiment thereof.

Although the airflow is controlled by controlling the rotational speed of the fan motor 30 in each embodiment of the present invention above, it may be controlled by mechanically controlling a wind passage.

Embodiment 7

Figure 14:
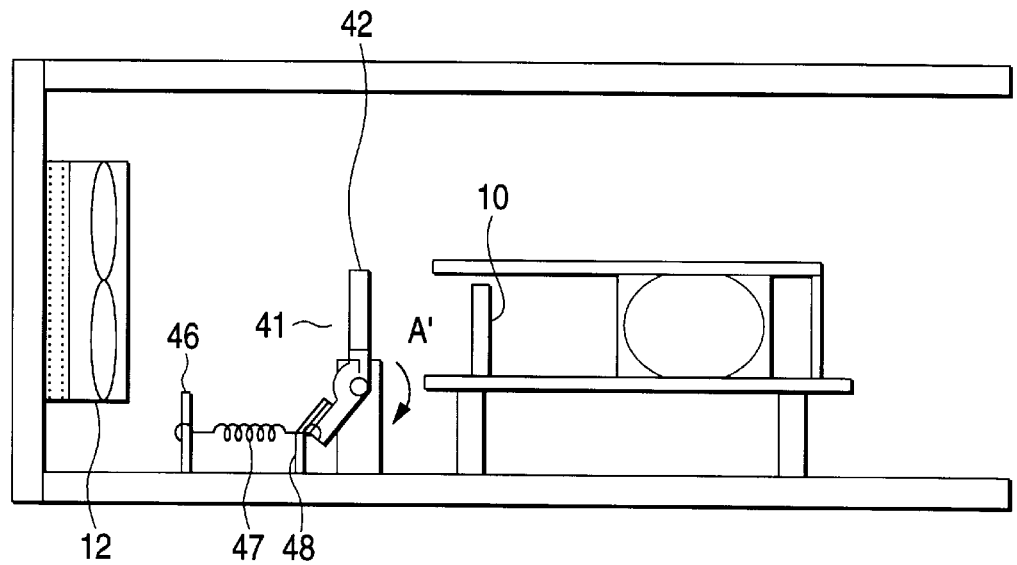
FIG. 14 is a schematic enlarged sectional view of an image reading apparatus as a seventh embodiment of the present invention.

FIG. 14 is a schematic enlarged sectional view of an image reading apparatus as a seventh embodiment of the present invention, wherein like reference characters are given to members corresponding to those in the first and second embodiments of the present invention.

In the seventh embodiment of the present invention, an airflow regulating mechanism 41 furnished with a slit plate 42 is placed between the cooling fan 12 and the read sensor 10. The slit plate 42 is moved away from the wind passage during the image reading operation so as to make air from the cooling fan 12 directly hit against the read sensor 10, whereas in the standby condition, a solenoid, for example, is used to rotationally move the slit plate 42 in between the cooling fan 12 and the read sensor 10 to decrease the airflow. The read sensor 10 is thus cooled.

Figure 15:
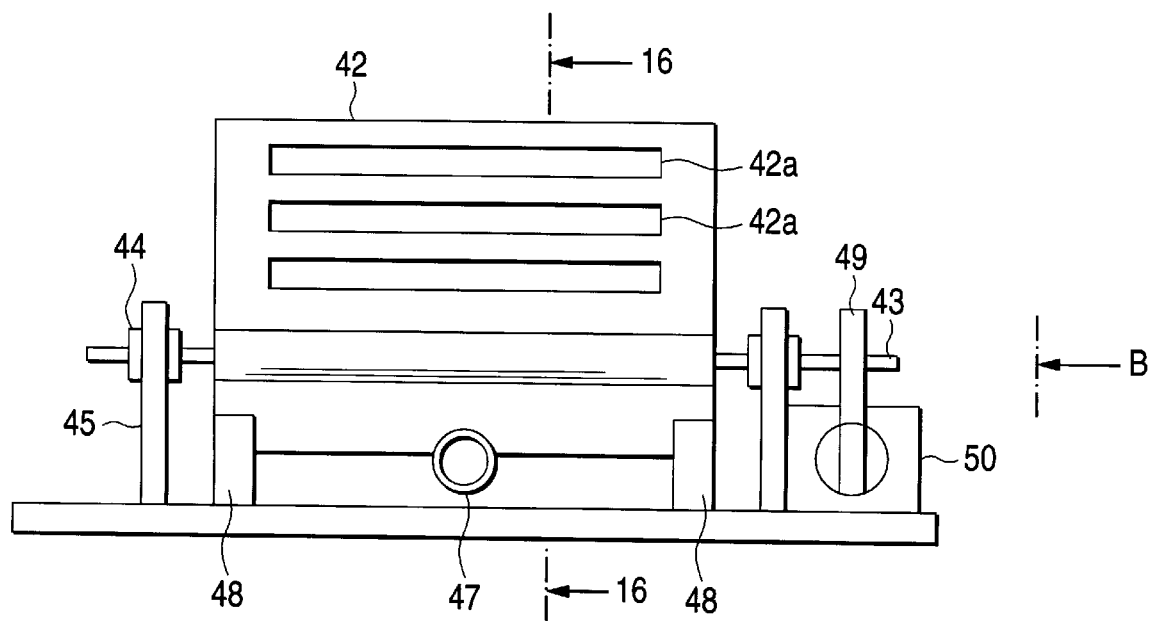
FIG. 15 is a schematic diagram of an airflow regulating mechanism as viewed from the cooling fan.
Figure 17:
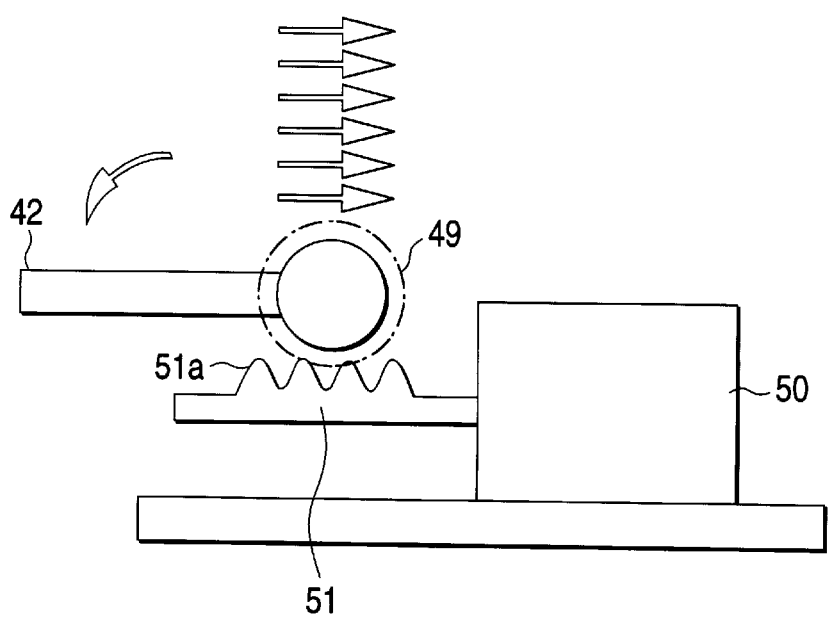
FIG. 17 is a schematic diagram illustrating the state of the airflow regulating slit plate during the reading operation.

FIG. 15 is a schematic diagram of the airflow regulating mechanism 41 as viewed from the cooling fan 12. The airflow regulating mechanism 41 is equipped with the rotatable slit plate 41. A plurality of slits 42a are formed in the slit plate 42, the slits being horizontally extended. The configuration and the number of slits 42a are selected so that the temperatures of the sensor in the standby condition and during the reading operation are substantially equal. The slit plate 42 is rotatably supported by support arms 45 via a rotary shaft 43 and bearings 44. Further, a spring 47 is stretched between the lower end portion of the slit plate 42 and a spring hooking member 46 uprightly planted in the casing 13 of the reading apparatus, and the slit plate 42 is urged in direction of arrow A' thereby as shown in FIG. 14. An angle of revolution of the slit plate 42 is regulated by stoppers 48. A gear 49 is fitted to the rotary shaft 43 of the slit plate 42 and meshes with a rack gear 51a (FIG. 17) to be driven by a pull-type solenoid 50.

Figure 16:
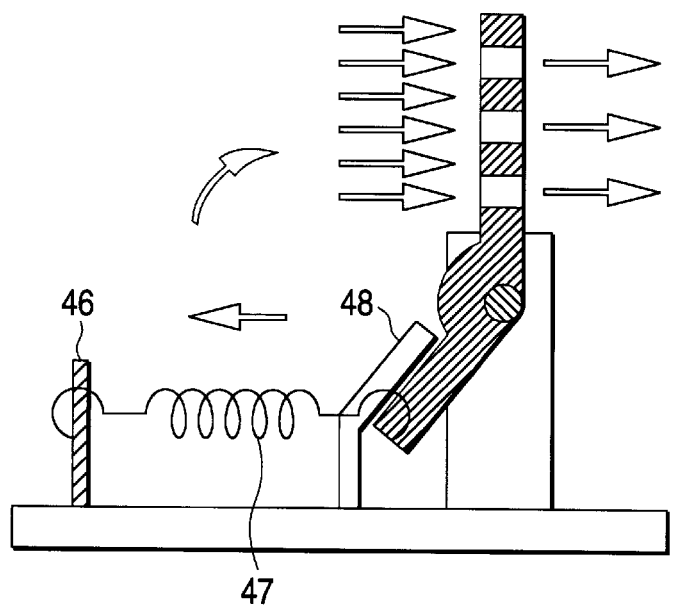
FIG. 16 is a schematic cross-section on line 16—16 of FIG. 15 and illustrating the state of an airflow regulating slit plate in the standby condition.

FIG. 16 is a schematic diagram illustrating the state of the airflow regulating slit plate 42 in the standby condition, and a sectional view taken on line 16—16 of FIG. 15. The slit plate 42 is raised by the spring force of the spring 47 and positioned by the stopper 48. When an instruction as to starting the reading operation is given in this state, the pull-type solenoid 50 operates to make a plunger 51 with a rack gear 51a retract, and the gear 49 meshing with the rack gear 51 turns counterclockwise, whereby the slit plate 42 incorporating the gear 49 via the rotary shaft 43 tilts counterclockwise. Consequently, the wind from the cooling fan 12 blows against the read sensor 10 without being blocked off by the slit plate 42 in the direction of B with an arrow in FIG. 15, thus cooling the read sensor 10 satisfactorily. Moreover, the wind from the cooling fan 12 is blown in the direction of the first carriage 5 so as to cool the irradiation lamp 2. The solenoid 50 is kept operating during the reading operation to maintain the condition above.

When the reading operation is terminated, the solenoid 50 is turned off and the plunger 51 is set free, whereby the slit plate 42 is pulled by the spring 47 up to the position shown in FIG. 16. The wind from the cooling fan 12 is blocked off by the slit plate 42 again and the airflow against the read sensor 10 is lowered.

Although a solenoid is used to provide driving force for turning the slit plate 42 in the seventh embodiment of the present invention, a motor may be employed instead.

Figure 18:
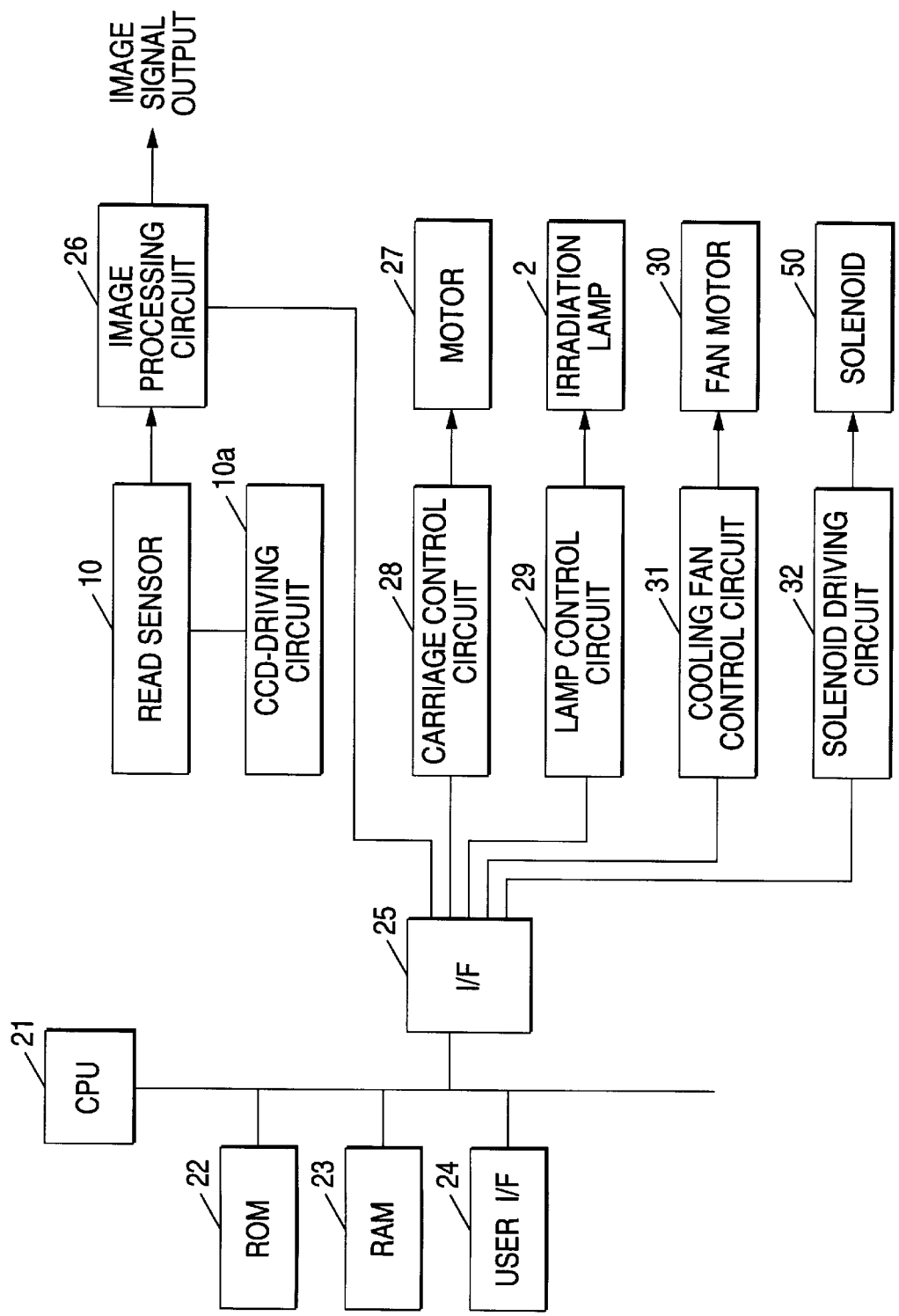
FIG. 18 is a block diagram showing the control system of the image reading apparatus of FIG. 14.

FIG. 18 is a block diagram showing the control system of the image reading apparatus of FIG. 14 and substantially similar in configuration to FIG. 3; however, the former is different from the latter in the following respects: the provision of a solenoid driving circuit 32 for controlling the operation of the solenoid 50 under the instruction of the CPU 21; and the constant operation of the fan during the standby period as well as the reading operation at all times in the cooling fan control circuit 31.

Figure 19:
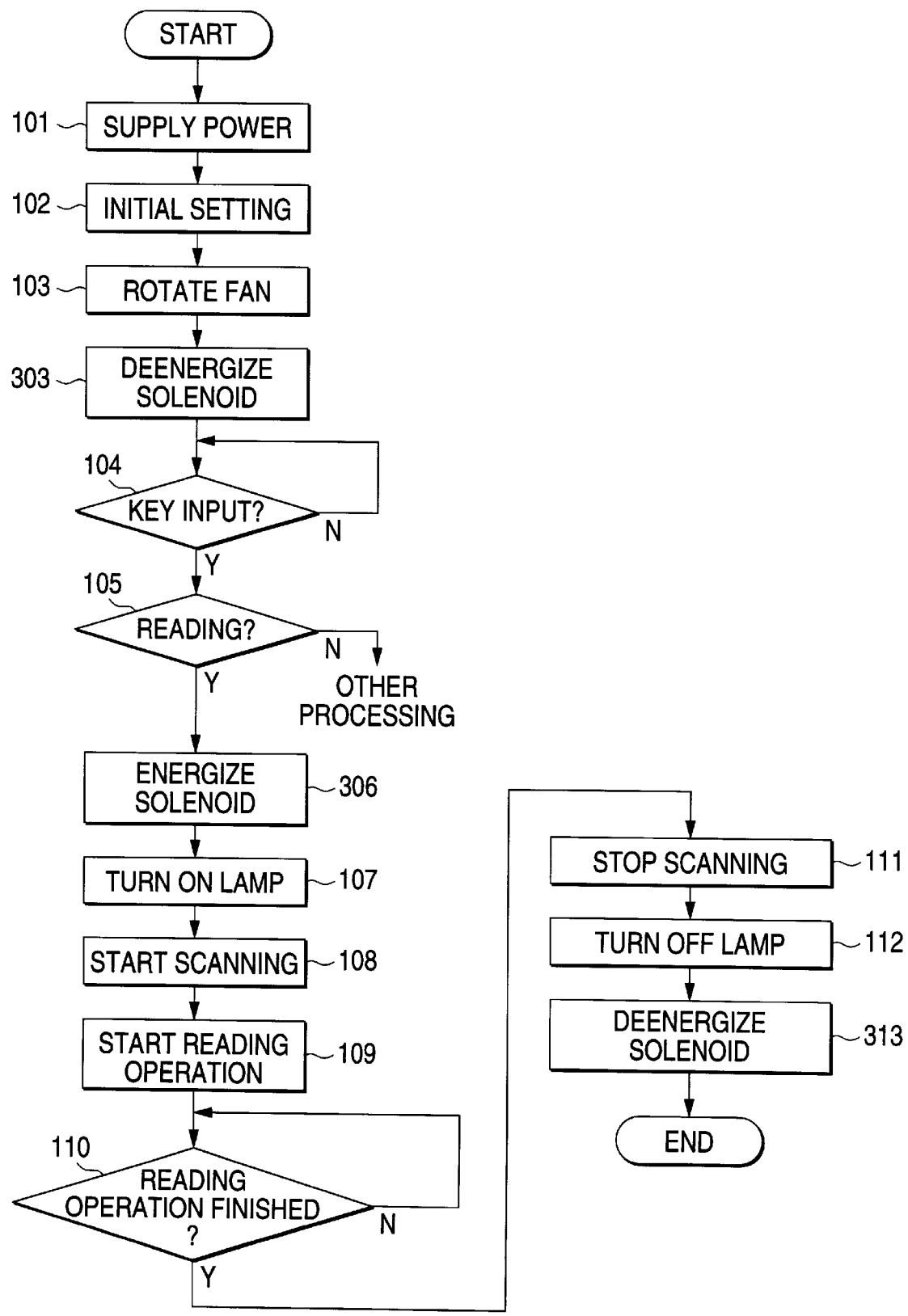
FIG. 19 is a flowchart illustrating the operation of the image reading apparatus as the seventh embodiment of the present invention.

FIG. 19 is a flowchart illustrating the operation of the image reading apparatus as the seventh embodiment of the present invention, wherein like reference characters are given to steps corresponding to those in the first embodiment of the present invention and the description thereof will be omitted.

In the seventh embodiment of the present invention, the solenoid 50 is deenergized by the solenoid driving circuit 32 according to the changeover control signal from the CPU 21, and the slit plate 42 is uprighted to block the wind from the cooling fan 12 at Step 303. The read sensor 10 in the standby condition is thus supplied with a small quantity of wind to the extent that the read sensor 10 generating heat by itself is cooled. At Step 306, moreover, the solenoid 50 is energized and the slit plate 42 tilts, whereby a great deal of wind from the cooling fan 12 is supplied to the read sensor 10 and the irradiation lamp 2 without a hitch. At Step 313, further, the airflow is decreased as the solenoid 50 is deenergized again to allow the slit plate 42 to be uprighted.

Embodiment 8

Figure 20:
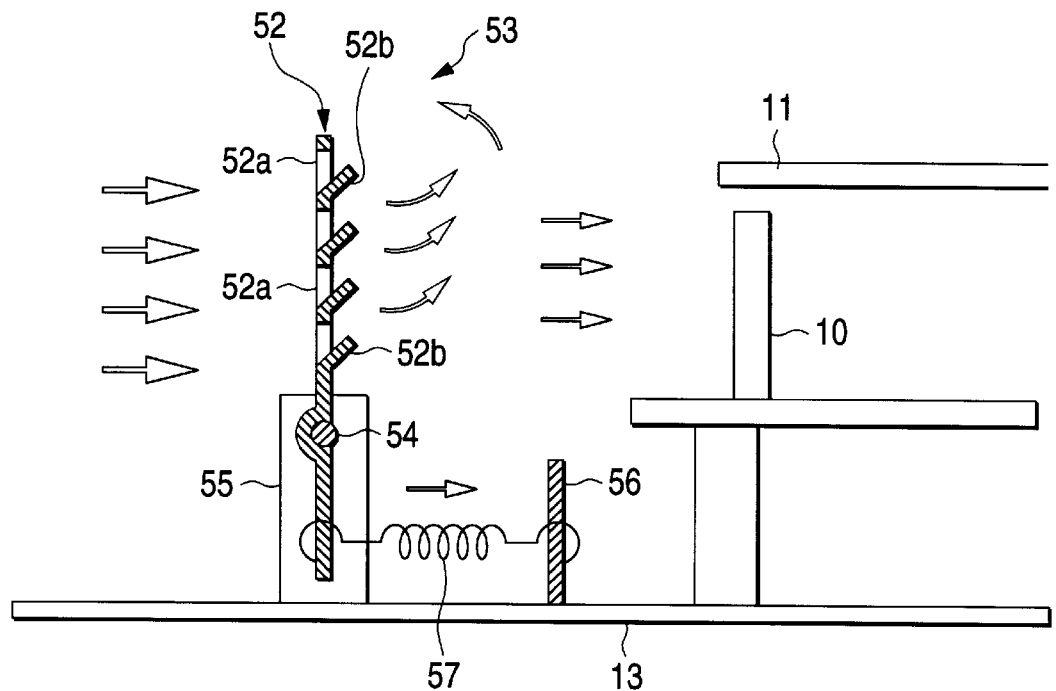
FIG. 20 is a schematic diagram illustrating the state of an airflow regulating slit plate in the standby condition in an eighth embodiment of the present invention.
Figure 21:
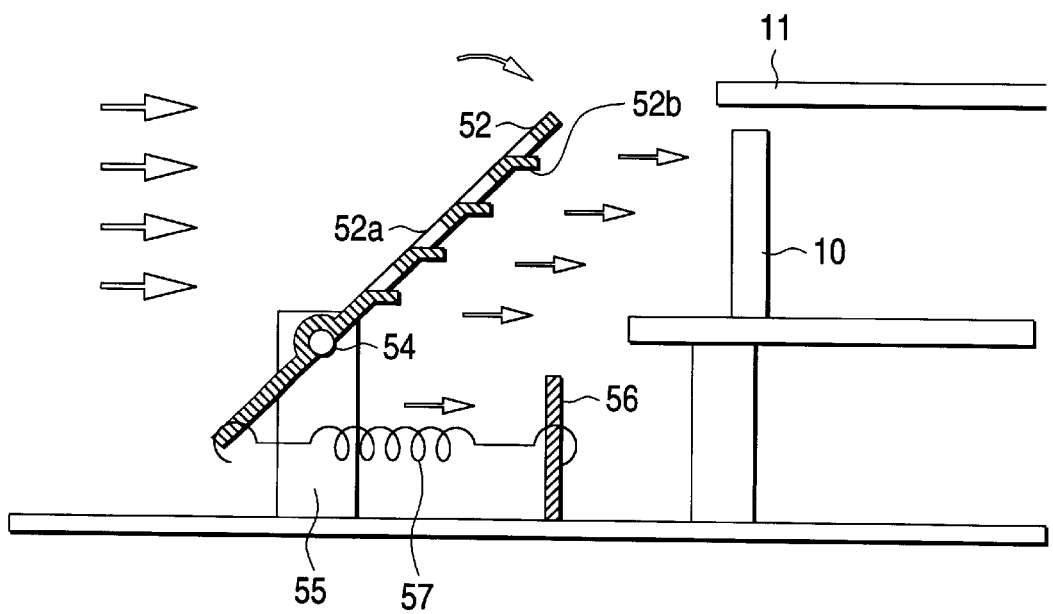
FIG. 21 is a schematic diagram illustrating the state of an airflow regulating slit plate during the reading operation in the eighth embodiment of the present invention.

FIGS. 20 and 21 are schematic enlarged sectional view of the principal part of an image reading apparatus as an eighth embodiment of the present invention. As in the seventh embodiment of the present invention, an airflow regulating mechanism 53 having a slit plate 52 is placed in between the cooling fan 12 and the read sensor 10 in the eighth embodiment of the present invention. FIG. 20 shows the slit plate 52 in the standby condition, whereas FIG. 21 shows the slit plate 52 during the reading operation.

Like the seventh embodiment of the present invention, a plurality of slits 52a are formed in the slit plate 52 and besides slats 52b bent in the downwind direction each adjoin the slits 52a. The slit plate 52 is rotatably supported by support arms 55 via a rotary shaft 54. Further, a spring 57 is stretched between the lower end portion of the slit plate 52 and a spring hooking member 56 uprightly planted in the casing 13 of the reading apparatus, and the slit plate 52 is urged counterclockwise as shown in FIG. 20. An angle of revolution of the slit plate 52 is regulated by stoppers (not shown). The slit plate 52 can be driven clockwise, though not shown, by a rotational driving mechanism using a solenoid, for example, as in the third embodiment of the present invention.

The rotational driving mechanism in the standby condition remains off and the slit plate 52 is pulled by the spring 57 to become uprighted. Accordingly, the wind from the cooling fan 12 passes through the slits 52a of the slit plate 52 and the hits against the plane of the slats 52b slantwise. Therefore, the direction of the wind passed through the slit plate 52 is changed upward, so that the airflow toward the read sensor 10 is reduced.

Simultaneously with the start of the reading operation, the slit plate 52 is tilted by the driving force of such as a solenoid toward the read sensor 10 as shown in FIG. 21, whereby the direction of the slats 52b of the slit plate 52 becomes parallel to the flow of the wind. The wind from the cooling fan 12 is allowed to flow toward the read sensor 10 without receiving any resistance from the slats 52b. The read sensor 10 and the irradiation lamp 2 can thus be cooled sufficiently.

Embodiment 9

Although the solenoid, for example, is used to turn the slit plate in the seventh and eighth embodiments of the present invention, the movement of the first scanning carriage may be interlocked with the rotational movement of the slit plate. FIG. 22 is a partial sectional view a ninth embodiment of the present invention shown by way of example.

Figure 23:
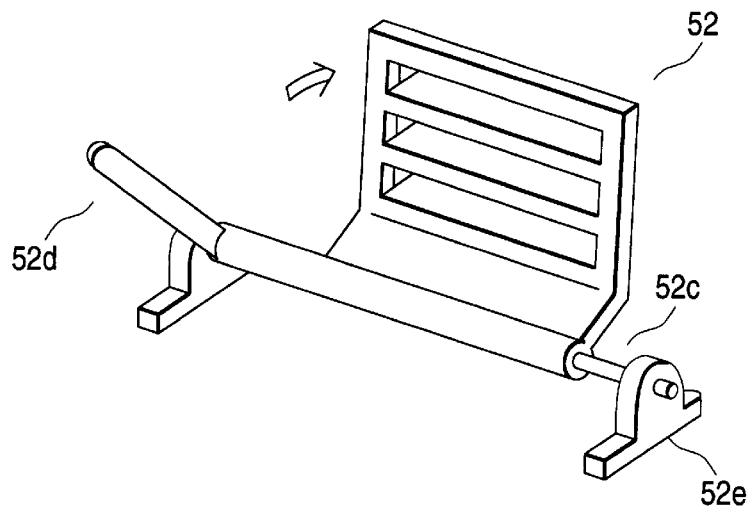
FIG. 23 is a perspective view of the rotational mechanism of the slit plate.

In the ninth embodiment of the present invention, an actuating member 5a is provided under the first scanning carriage 5, and a lever 52d abutting against the actuating member 5a is provided for the shaft 52c of the slit plate 52. FIG. 23 is a perspective view of the rotational mechanism of the slit plate 52. The shaft 52c of the slit plate 52 is rotatably supported with bearings 52e, and the lever 52d is provided at one end of the shaft 52c.

Figure 24:
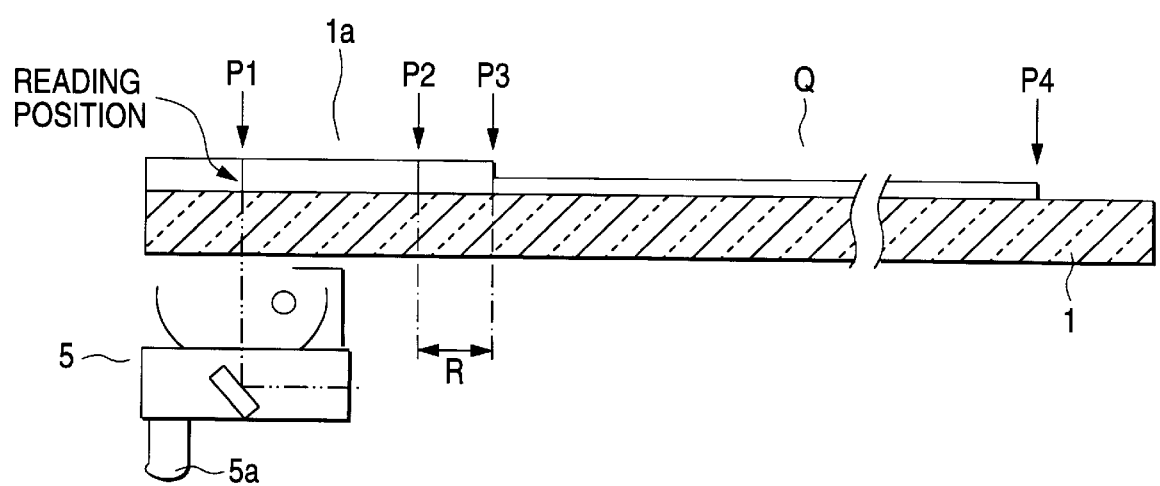
FIG. 24 shows the relation between the first scanning carriage and the glass platen.

FIG. 24 shows the relation between the first scanning carriage 5 and the glass platen 1 by way of example. In FIG. 24, P1 represents a standby position; P2 a position where reading is started; P3 the leading end position of an original; and P4 the trailing end position thereof. Each position is based on the reading position of the first scanning carriage 5 as a reference. Moreover, reference symbol Q represents an original; and R, an approach run distance. A run-against-original plate 1a which functions as a white reference plate for shading correction is provided on the home position side, that is, the standby side of the glass platen 1, and the first scanning carriage 5 in the standby condition is located under the run-against-original plate 1a.

A description will subsequently be given of the operation.

Figure 22A:
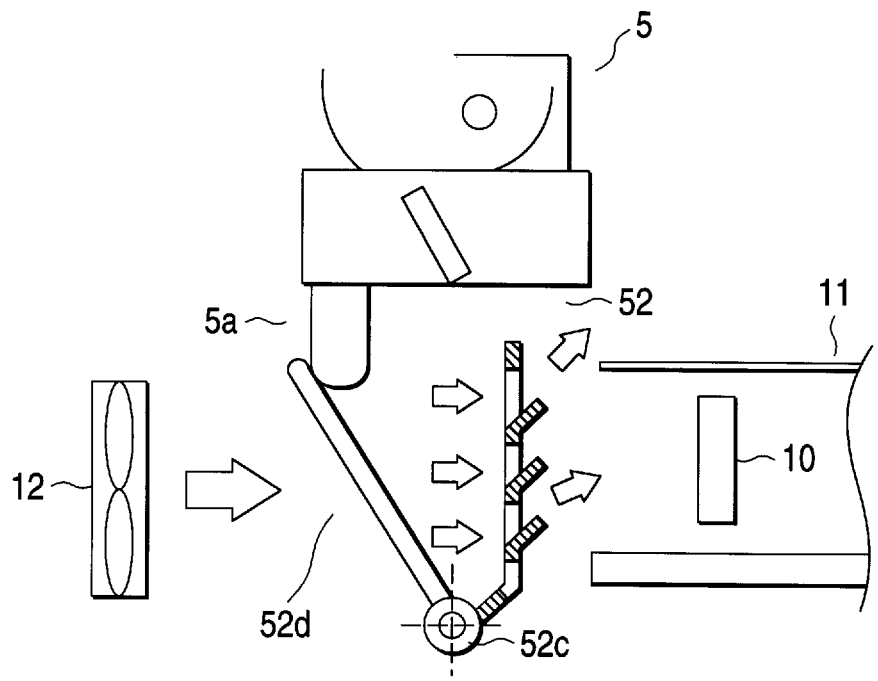
FIGS. 22A and 22B are partial sectional views of a ninth embodiment of the present invention.

In the standby condition, as shown in FIG. 22A, the lever 52d is turned counterclockwise by the actuating member 5a of the first scanning carriage 5 to upright the slit plate 52. On receiving the wind from the cooling fan 12 on the left-hand side, the slit plate 52 attempts to tilt clockwise. However, the lever 52d is stopped and fixed by the actuating member 5a.

Figure 22B:
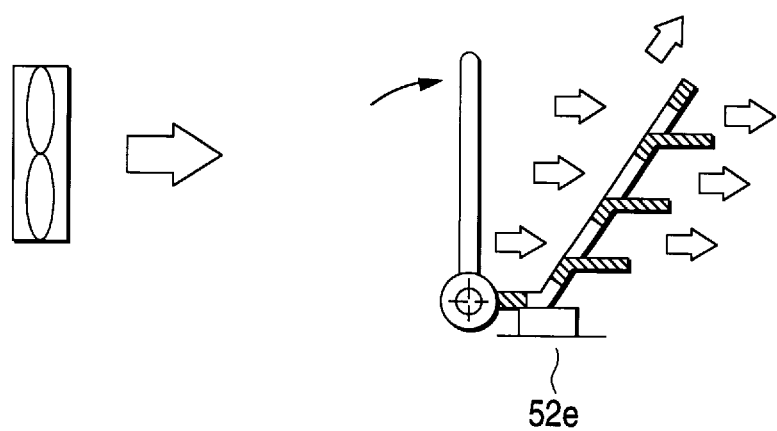

When a reading instruction is subsequently issued, the first scanning carriage 5 is caused to move from the standby position P1 rightward in FIG. 22 up to the position P2 where reading is started and performs the reading operation. As shown in FIG. 22A then, the slit plate 52 is made to turn clockwise up to the stopper 52e because of the wind from the cooling fan 12 on the left-hand side. Thus the slit angle is altered so as to increase the airflow toward the read sensor 10. Since the first scanning carriage 5 reciprocates between the position P2 where reading is started and the trailing end position P4 of the original during the reading operation, its actuating member 5a is prevented from tilting the lever 52d of the slit plate 52, so that the slit plate 52 is allowed to maintain the state shown in FIG. 22B.

As set forth above, the absence of any control operation to be performed by a solenoid, for example, results in incurring no additional power consumption in the ninth embodiment of the present invention. Since the movement of the slit plate can be interlocked with the operation/non-operation of the reading apparatus, further, variation in sound is restrained from being intermittently produced.

Embodiment 10

Figure 25A:
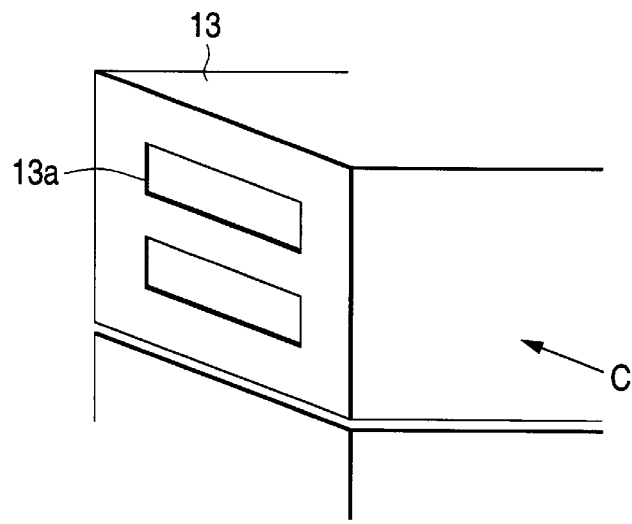
FIGS. 25A and 25B show a schematic perspective and a schematic sectional views of the principal part in a tenth embodiment of the present invention.
Figure 25B:
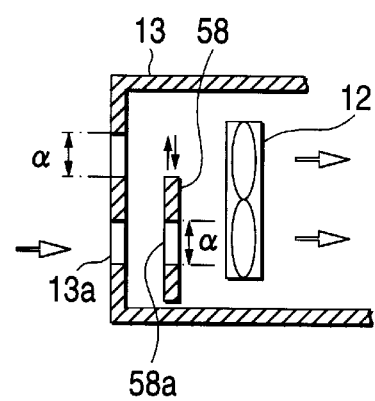

FIGS. 25A and 25B are schematic perspective and sectional views of the principal part of an image reading apparatus as a tenth embodiment of the present invention. In the tenth embodiment of the present invention, an airflow regulating slit plate 58 is placed in between air intakes 13a formed in the side of the casing 13 and the cooling fan 12, and slid by the driving force of a solenoid (not shown) in a direction perpendicular to the direction in which the slit is extended so as to regulate an airflow to be discharged.

The air intake 13a is extended in the horizontal direction with a width of α in the vertical direction, and a slit 58a formed in the slit plate 58 and extended in the horizontal direction also has a width of α. The slit plate 58 is vertically moved so as to superimpose the air intake 13a and the slit 58a during the reading operation, whereby the air passed through the air intakes 13a is allowed to pass through the slit plate 58 directly to secure a sufficient airflow. On the other hand, the airflow is reduced by vertically moving the slit plate 58 to shift the position of the slit 58a from that of the air intake 13a in the standby condition.

Figure 26A:
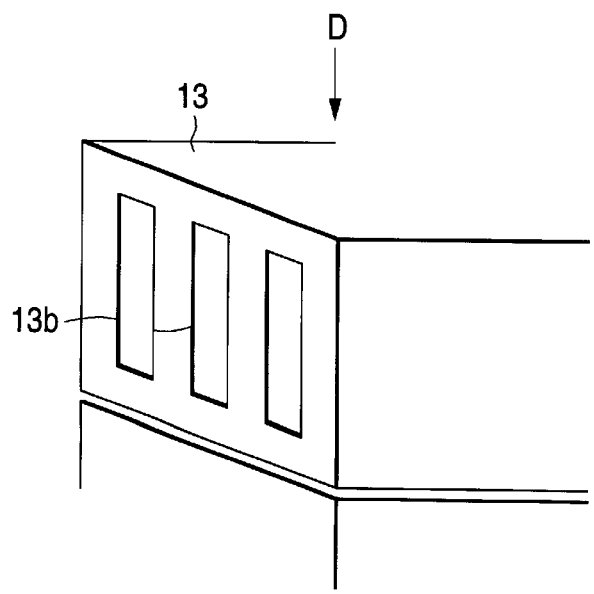
FIGS. 26A and 26B show a schematic perspective and a schematic sectional views of the principal part in a modified tenth embodiment of the present invention.
Figure 26B:
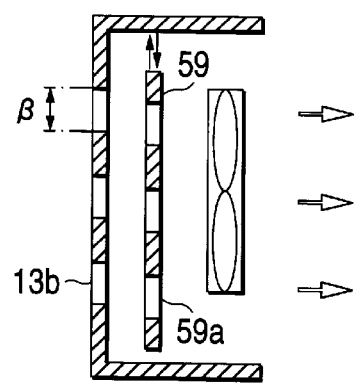

FIGS. 26A and 26B are schematic perspective and sectional views of the principal part of an image reading apparatus as a modified tenth embodiment of the present invention. In the modified embodiment of the present invention shown in FIG. 26, air intakes 13b having a width of β are each extended in the vertical direction, and slits 59a also having a width of β are each extended vertically in a slit plate 59 in agreement with the air intakes 13*b*, the slit plate 59 being allowed to slide in the horizontal direction.

In the modified embodiment of the present invention, an airflow is increased by horizontally sliding the slit plate 59 during the reading operation to positionally conform the slits 59*a* having a width of β to the air intakes 13*b* also having a width of β, respectively. As shown in FIG. 26B, further, the airflow is decreased by shifting the positions of the slits 59*a* from those of the respective air intakes 13*b* in the standby condition.

In the tenth embodiments of the present invention, the slits 58, 59 are placed between the frame 13 and the fan 12. Since the slit closes part of the opening of the frame 13 in the standby condition, the airflow from the fan is controllable and it also works to prevent the noise produced by the fan 12 in the reading apparatus from leaking outside.

As set forth above, accurate reading is made feasible even in any color image reading apparatus according to the present invention since it is possible to minimize variation in the temperature of the read sensor for a certain time after the image reading operation is started.

Moreover, noise becomes reducible since the cooling fan is kept rotating without intervals even when the lamp is turned off for only a short time so as to decrease to number of interruptions of the cooling fan.

What is claimed is:

1. An image reading apparatus comprising:

an irradiation lamp for exposing to light an image on a reading plane;

a read sensor for reading the image on the reading plane;

a fan in an air passage in which the irradiation lamp and the read sensor are also placed;

fan driving means for driving the fan; and airflow reducing means for reducing quantity of air generated from the fan driven by the fan driving means and allowed to reach the read sensor for a finite time period during which the irradiation lamp is off.

2. An image reading apparatus as claimed in claim 1, wherein the airflow reducing means controls the fan driving means so as to reduce the number of revolutions of the fan per unit time.

3. An image reading apparatus comprising:

an irradiation lamp for exposing to light an image on a reading plane;

a read sensor for reading the image on the reading plane;

a fan in an air passage in which the irradiation lamp and the read sensor are also placed;

fan driving means for driving the fan; and fan drive control means for operating the fan driving means during the time the irradiation lamp is on and for a finite period of time after it is turned is off.

4. An image reading apparatus comprising:

an irradiation lamp for exposing to light an image on a reading plane;

a read sensor for reading the image on the reading plane;

a fan in an air passage in which the irradiation lamp and the read sensor are also placed;

fan driving means for operating the fan; and airflow reducing means for reducing quantity of air generated from the fan driven by the fan driving means and allowed to reach the read sensor while the irradiation lamp is off, the airflow reducing means causing the fan driving means to operate intermittently in a manner so that operation of the fan is not stopped.

5. An image reading apparatus comprising:

an irradiation lamp for exposing to light an image on a reading plane;

a read sensor for reading the image on the reading plane;

a fan in an air passage in which the irradiation lamp and the read sensor are also placed;

fan driving means for operating the fan;

airflow reducing means for reducing quantity of air generated from the fan driven by the fan driving means and allowed to reach the read sensor while the irradiation lamp is off; and air flow regulating means for switching the airflow in the air passage between a reduced state and a non-reduced state, said airflow reducing means being used to switch the air flow regulating means to the reduced state.

6. The image reading apparatus as claimed in claim 5, wherein the air flow regulating means is positioned on a fan air intake side of the air passage.

7. An image reading apparatus comprising:

an irradiation lamp for exposing to light an image on a reading plane;

a read sensor for reading the image on the reading plane;

a fan in an air passage in which the irradiation lamp and the read sensor are also placed;

fan driving means for operating the fan;

airflow reducing means for reducing quantity of air generated from the fan driven by the fan driving means and allowed to reach the read sensor while the irradiation lamp is off; and fan-driving prohibiting means for prohibiting the fan from being operated by the fan driving means for a predetermined time after the supply of power to the read sensor is started.

8. An image reading apparatus comprising:

an irradiation lamp for exposing to light an image on a reading plane;

a read sensor for reading the image on the reading plane;

a fan in an air passage in which the irradiation lamp and the read sensor are also placed;

fan driving means for operating the fan; and airflow reducing means for reducing quantity of air generated from the fan driven by the fan driving means and allowed to reach the read sensor while the irradiation lamp is off, operation of the air flow reducing means being interlocked with the location of the irradiation lamp at a predetermined position.

* * * * *

UNITED STATES PATENT AND TRADEMARK OFFICE
CERTIFICATE OF CORRECTION

PATENT NO. : 5,860,042
DATED : January 12, 1999
INVENTOR(S) : TOMARU et al.

It is certified that error appears in the above-identified patent and that said Letters Patent is hereby corrected as shown below:

Claim 3, column 13, line 55, before "off", delete "is".

Signed and Sealed this

Fourth Day of April, 2000

Attest:

Attesting Officer

Q. TODD DICKINSON
Director of Patents and Trademarks